United States Patent
Sjoholm et al.

(10) Patent No.: US 9,112,525 B1
(45) Date of Patent: Aug. 18, 2015

(54) SYSTEM AND METHOD FOR PARALLEL HASH-BASED DATA COMPRESSION

(71) Applicant: Comtech EF Data Corp., Tempe, AZ (US)

(72) Inventors: Seth Sjoholm, Moscow, ID (US); Edward Ray Coulter, Moscow, ID (US)

(73) Assignee: Comtech EF Data Corp., Tempe, AZ (US)

( * ) Notice: Subject to any disclaimer, the term of this patent is extended or adjusted under 35 U.S.C. 154(b) by 0 days.

(21) Appl. No.: 14/672,785

(22) Filed: Mar. 30, 2015

Related U.S. Application Data

(60) Provisional application No. 61/972,110, filed on Mar. 28, 2014.

(51) Int. Cl.
| | | |
|---|---|---|
| *H03M 7/00* | (2006.01) | |
| *H03M 7/30* | (2006.01) | |
| *G06F 11/14* | (2006.01) | |
| *H04L 29/06* | (2006.01) | |
| *G06F 21/72* | (2013.01) | |
| *H04L 12/801* | (2013.01) | |

(52) U.S. Cl.
CPC ......... *H03M 7/3084* (2013.01); *G06F 11/1451* (2013.01); *G06F 21/72* (2013.01); *H03M 7/30* (2013.01); *H04L 29/06* (2013.01); *H04L 47/10* (2013.01)

(58) Field of Classification Search
CPC ...... H03M 7/30; G06F 21/72; G06F 11/1451; H04L 47/10
USPC .................. 341/106; 713/189; 707/100, 646; 370/471, 470
See application file for complete search history.

(56) References Cited

U.S. PATENT DOCUMENTS

2004/0160983 A1 * 8/2004 Kuskin et al. ................. 370/471

\* cited by examiner

*Primary Examiner* — Joseph Lauture
(74) *Attorney, Agent, or Firm* — Booth Udall Fuller, PLC

(57) ABSTRACT

A method of parallel hash-based data compression comprising generating a hash value based on one or more original input data bytes of an incoming data stream using a processor, looking up, by the processor, a hash head comprising a first potential match location identified by the hash value and looking up, by the processor, at least one additional potential match location in a hash chain that comprises a linked list of potential match locations starting with a location indexed by the hash head. The method further comprises checking, by the processor, the at least one potential match location of the hash chain for one or more valid matches in a history buffer random access memory (RAM) and outputting, by the processor, a length and distance pair if a valid match is detected or the original input data byte if a match is undetected.

24 Claims, 10 Drawing Sheets

SYSTEM AND METHOD FOR PARALLEL HASH-BASED DATA COMPRESSION

CROSS REFERENCE TO RELATED APPLICATIONS

This document claims the benefit of the filing date of U.S. Provisional Patent Application No. 61/972,110, entitled "System and Method for Parallel Hash-Based Data Compression" to Seth Sjoholm et al., which was filed on Mar. 28, 2014, the disclosure of which is hereby incorporated entirely by reference herein.

BACKGROUND

1. Technical Field

Aspects of this document relate generally to the fields of data compression and decompression.

2. Background Art

Existing specialized content addressable memory (CAM)-based architecture has traditionally been used for searching for optimal matches among historical data in data compression engines. This architecture has allowed every possible match to be tracked to find the longest match; however, one drawback of such a system is that it doesn't scale well with larger history sizes and causes routing problems, particularly in FPGA's.

The general concept of a hash-based compression architecture is also known in software compression engines as well as hash-based compression hardware. A hashing algorithm typically looks only at one potential match at a time and has to evaluate several potential matches to determine which potential match is the best one. To improve the speed of this process the search ends when a "good enough" match is found. This results in variable throughput based on the number of potential matches searched and the data being compressed.

The complexity of Lempel-Ziv (LZ) compression lies in searching for repeated strings in a stream of data. This search has traditionally been time consuming in software development and resource-intensive in terms of hardware needed. U.S. Pat. No. 8,046,532 provides one such example of CAM based data compression, the content of which is incorporated herein by reference in its entirety.

SUMMARY

Implementations of a method of parallel hash-based data compression may comprise generating a hash value based on one or more original input data bytes of an incoming data stream using a processor, looking up, by the processor, a hash head comprising a first potential match location identified by the hash value, looking up, by the processor, at least one additional potential match location in a hash chain that comprises a linked list of potential match locations starting with a location indexed by the hash head, checking, by the processor, the at least one potential match location of the hash chain for one or more valid matches in a history buffer random access memory (RAM), and outputting, by the processor, a length and distance pair if a valid match is detected or the original input data byte if a match is undetected.

Particular implementations may comprise one or more of the following features. The history buffer RAM may comprise a plurality of history buffer RAMs such that each history buffer RAM corresponds to a separate hash chain RAM. The method may further comprise assigning each of a plurality of potential match locations to a separate history buffer RAM from among the plurality of history buffer RAMs. The method may further comprise comparing the original input data byte and subsequent input data bytes to a byte in the history buffer RAM at each potential match location and one or more subsequent bytes from each corresponding location and finding all matches beginning at each potential match starting location having at least a minimum match length.

The method may further comprise comparing a different plurality of potential match locations to a next incoming raw data byte when a match of a minimum length beginning at any of the prior plurality of potential match locations remains undetected. In some implementations, an average data processing rate may be equal to at least one uncompressed data byte per clock cycle. The method may further comprise comparing a next plurality of potential match locations after a comparison of a first plurality of potential match locations has begun.

The method may further comprise selecting a longest match and outputting at least one of: a length and offset in the history buffer RAM to the longest match when the longest match is among a first set of matches; the length and offset in the history buffer RAM to the longest match from the first set of matches when the longest match between the first and a second set of matches is equal; and a raw data byte that precedes the longest match and the length and offset in the history buffer RAM to the longest match when the longest match is among the second set of matches.

In some implementations, the plurality of history buffer RAMs is comprised of RAMs of varying sizes. In some implementations, the plurality of history buffer RAMs is organized in increasing sizes such that a higher number of more recent matches is searched while using equivalent RAM resources.

In some implementations, the data processing rate is reduced such that a number of history buffer RAMs performing comparisons to determine a matching location address is proportionally increased by using additional time to search for multiple matches in each hash chain and history buffer RAM. In some implementations, the hash head and N−1 hash chain RAMs are organized to identify N potential match starting positions each clock cycle.

Implementations of a system for parallel hash-based data compression may comprise a history buffer random access memory (RAM) and a processor configured to generate a hash value based on one or more original input data bytes of an incoming data stream, look up a hash head comprising a first potential match location identified by the hash value, look up at least one additional potential match location in a hash chain that comprises a linked list of potential match locations starting with a location indexed by the hash head, check the at least one potential match location of the hash chain for one or more valid matches in the history buffer RAM, and output a length and distance pair if a valid match is detected or the original input data byte if a match is undetected.

Particular implementations may comprise one or more of the following features. The history buffer RAM may comprise a plurality of history buffer RAMs such that each history buffer RAM corresponds to a separate hash chain RAM. The processor may be further configured to assign each of a plurality of potential match locations to a separate history buffer RAM from among the plurality of history buffer RAMs. The processor may be further configured to compare the original input data byte and subsequent input data bytes to a byte in the history buffer RAM at each potential match location and one or more subsequent bytes from each corresponding location and find all matches beginning at each potential match starting location having at least a minimum match length.

The processor may be further configured to compare a different plurality of potential match locations to a next incoming raw data byte when a match of a minimum length beginning at any of the prior plurality of potential match locations remains undetected. An average data processing rate may be equal to at least one uncompressed data byte per clock cycle. The processor may be further configured to compare a next plurality of potential match locations after a comparison of a first plurality of potential match locations has begun.

The processor may be further configured to select a longest match and output at least one of: a length and offset in the history buffer RAM to the longest match when the longest match is among a first set of matches; the length and offset in the history buffer RAM to the longest match from the first set of matches when the longest match between the first and a second set of matches is equal; and a raw data byte that precedes the longest match and the length and offset in the history buffer RAM to the longest match when the longest match is among the second set of matches.

In some implementations, the plurality of history buffer RAMs is comprised of RAMs of varying sizes. In some implementations, the plurality of history buffer RAMs is organized in increasing sizes such that a higher number of more recent matches is searched while using equivalent RAM resources. In some implementations, the data processing rate is reduced such that a number of history buffer RAMs performing comparisons to determine a matching location address is proportionally increased by using additional time to search for multiple matches in each hash chain and history buffer RAM. In some implementations, the hash head and N−1 hash chain RAMs are organized to identify N potential match starting positions each clock cycle.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of pre-AIA 35 U.S.C. §112, ¶6 and post-AIA 35 U.S.C. §112(f). Thus, the use of the words "function," "means" or "step" in the Description, Drawings, or Claims is not intended to somehow indicate a desire to invoke the special provisions of pre-AIA 35 U.S.C. §112, ¶6 and post-AIA 35 U.S.C. §112(f), to define the invention. To the contrary, if the provisions of pre-AIA 35 U.S.C. §112, ¶6 and post-AIA 35 U.S.C. §112(f) are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of pre-AIA 35 U.S.C. §112, ¶6 and post-AIA 35 U.S.C. §112(f). Moreover, even if the provisions of pre-AIA 35 U.S.C. §112, ¶6 and post-AIA 35 U.S.C. §112(f) are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, frequency examples, or methods disclosed herein. Many additional components and assembly procedures known in the art consistent with data compression methodologies are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

The methods and systems of this disclosure relate to a hash-based data compression architecture which offers increased efficiency of resources for FPGA and ASIC implementations. Implementations of the disclosed system and methods may comprise one or more of the following techniques: searching multiple matches in parallel, performing lazy matching, and using a mixture of history buffer sizes to make better use of available resources.

The methods and systems described in this disclosure may utilize one or more of the following hardware components, any one of which may be referred to by the generalized term "processor" throughout the remainder of this disclosure: Field-Programmable Gate Array (FPGA), Programmable Logic Device (PLD), Programmable Integrated Circuit (PIC), Digital Signal Processor (DSP), Application Specific Integrated Circuit (ASIC) or microprocessors using conventional implementation methods known in the art with knowledge of this disclosure.

Parallel Hashing Compressor

Implementations of the methods and systems of parallel hash-based compression architecture disclosed herein may search N potential matches at a time while maintaining a constant data throughput such as for example, a one byte per clock constant throughput. Since the hash-based architectures of this disclosure uses random access memory (RAM) rather than registers or latches to store the buffer history data, implementations described herein of scale well to large history buffer sizes and are easily implemented in both FPGA and ASIC implementations. This increased history buffer size can compensate for the drawback of a more limited number of potential matches being searched. Area and compression ratio performance may also be adjusted for a particular application by adjusting the history size and the number of potential matches searched in accordance with the remainder of this disclosure.

Figure 1:
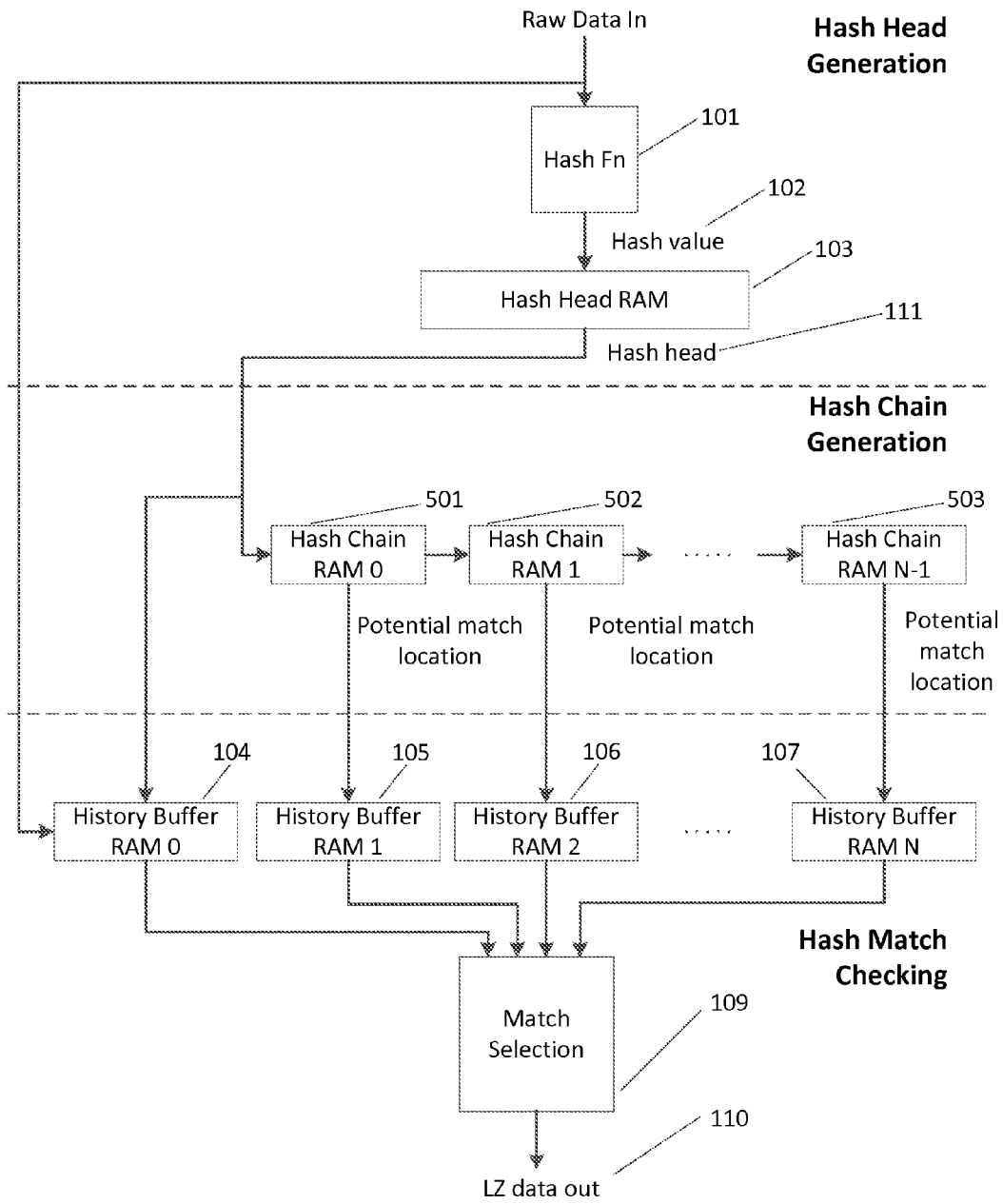
FIG. 1 depicts an exemplary block diagram of an implementation of a system for parallel hashing data compression.

In many applications, in order to make the hashing compression core practical in its hardware aspects, it may be preferable that the average processing rate be at least one uncompressed byte per clock cycle. Although the traditional hashing method produces hash head values at this rate, the hash chain lookup and match checking steps of this disclosure can take much longer and thus, there is a significant advantage to parallelization as described herein. FIG. 1 provides an exemplary block diagram of a parallel hashing compressor.

As shown, in some implementations, the parallel hashing compressor function can be divided into three logical modules or functions. In the first function, hash head generation, a processor executes a hashing function 101 which generates a hash value 102 for the incoming raw data byte. This hash value 102 is used to generate a hash head 111 which comprises a first potential match location identified by the hash value 102. Hash head 111 may be stored in hash head RAM 103. In the second function, hash chain generation, a hash chain comprising a linked list of potential match locations may then be accessed for a lookup starting with a location that is indexed by the hash head 111. The hash chain(s) are stored within a plurality of parallel hash chain RAMs 501, 502, 503 and at least one potential match location of the hash chain may be checked for one or more valid matches stored in one or more history buffer RAMs 104, 105, 106, 107. The history buffer RAMs are located in the third function which is directed to hash match checking Once this match selection 109 is determined in accordance with the remainder of the process described in this disclosure, the matching LZ data is output 110 in the form of a length and distance pair in the case of a valid match being found or as the original input data byte if no match is found.

Hash Head Generation in a Parallel Hashing Compressor

Some implementations may comprise a module that generates hash values for each incoming raw byte and outputs the history buffer location of the last raw byte that had the same hash value. A table may be maintained in which for each possible hash value, the history buffer location of the last byte that had the same hash value is stored. A counter may be used to keep track of the history buffer location of each incoming byte.

In some implementations, for each incoming raw data byte, the running hash value may be updated using the equation: hash=(hash<<c) XOR b where b is the raw byte value and c is HASH_SHIFT or HASH_SHIFT_2B, a shift amount determined by the minimum number of matching bytes required to start a match.

In the implementations of this disclosure, the hash value associated with a byte of input data is calculated using that byte and the next one or two bytes in the data stream. Accordingly, the hash value needs to be updated two or three times before the hash value is obtained for the first byte of the block. After that, the hash value can be output at a rate of one hash value per input transfer until the end of the block (this may be identified as di_raw_end being active on an input transfer). One or two more hash values then need to be output to account for the one or two that were buffered up before hash values started being output. The hash values for these transfers aren't necessarily of value in terms of the implementations of this disclosure and will not be discussed at length here. Since the next one or two bytes in the data stream are not known for the purpose of calculating a correct hash value, it is assumed that matches won't start at these locations.

A counter may be used to keep track of where each raw data byte goes in the history buffer. The counter is incremented each time a hash value is output and rolls over to 0 from MAX_HISTORY_SIZE−1. The hash value is used as an address into a random access memory (RAM). For each input byte, the history buffer location is written to the RAM location pointed to by the hash value and the old value stored in the RAM is read and output on the hash head output port.

One option for configuring the hashing compression core is to do so through constants in a VHDL package called hash_pkg which may reside in a project common library location. This allows complex data types to be defined that can be shared by the hashing compressor modules and such a method of configuration will be referred to in the remainder of this disclosure for exemplary purposes. This module may use the constants MAX_HISTORY_SIZE, HISTORY_SIZE_BITS, HASH_BITS, HASH_HEADS, HASH_SHIFT, and HASH_SHIFT_2B.

It is desirable to have a compressor that is configurable on-the-fly to perform different types and efforts of compression. One way to implement such a compressor is to use a control header to specify compression options on a compression block by block basis. An exemplary format of such a control header and requirements are described below:

| Control header description | | |
|---|---|---|
| HBR | (0) | History buffer reset. If set, history buffer is reset prior to accepting data for the new block. |
| Context Data | (1) | This data is context data, output is dumped |
| Raw Only | (2) | When set the block size must be limited to Buffer Size raw bytes in all cases. |
| 2 byte | (3) | When set to one, it enables the compressor to allow two byte matches. |
| Zero Block | (4) | Zero Length Block. No data associated with the header. |
| History Size | (6 downto 5) | Used to control the history window size. The default is MAX<br>00 MAX<br>01 2 K<br>10 1 K<br>11 512 |
| Effort | (8 downto 7) | Compression effort, used to trade off speed for compression ratio.<br>00 Fastest<br>01 Reserved, maps to Fastest for now.<br>10 Reserved, maps to Best for now.<br>11 Best compression ratio |

The following is an example of possible requirements of this configuration offered as a non-limiting example:

Wait for a control header with Zero Block==0 before processing any raw data.

After processing a block of raw data, wait for another control header with Zero Block==0 before accepting more raw data.

When a control header has Zero Block==1, wait for another control header before processing the next raw block.

When 2 byte is 0 in the control header, calculate a hash value for each raw byte using that byte and the next two in the block. If there are no further bytes in the block, use 0x00 valued bytes (invalid hash values). Equation: hash=(hash<<HASH_SHIFT) XOR raw_byte When 2 byte is 1 in the control header, calculate a hash value for each raw byte using that byte and the next one in the block. If there are no further bytes in the block, use 0x00 valued bytes (invalid hash values). Equation: hash=(hash<<HASH_SHIFT_2B) XOR raw_byte For each raw byte, output the history buffer location of the last byte with the same hash value.

History buffer locations for raw bytes with invalid hash values (i.e. last 1 or 2 bytes that use 0x00) are not to be saved for later use (although the old history buffer location for the invalid hash is still output).

Start with history buffer location 0 after a reset.

Return to history buffer location 0 when a control header is received with HBR set.

Increment history buffer location by 1 for each byte rolling over to 0 after MAX_HISTORY_SIZE−1.

Ignore Context Data, Raw Only, History Size, and Effort fields of the control header.

Figure 2:
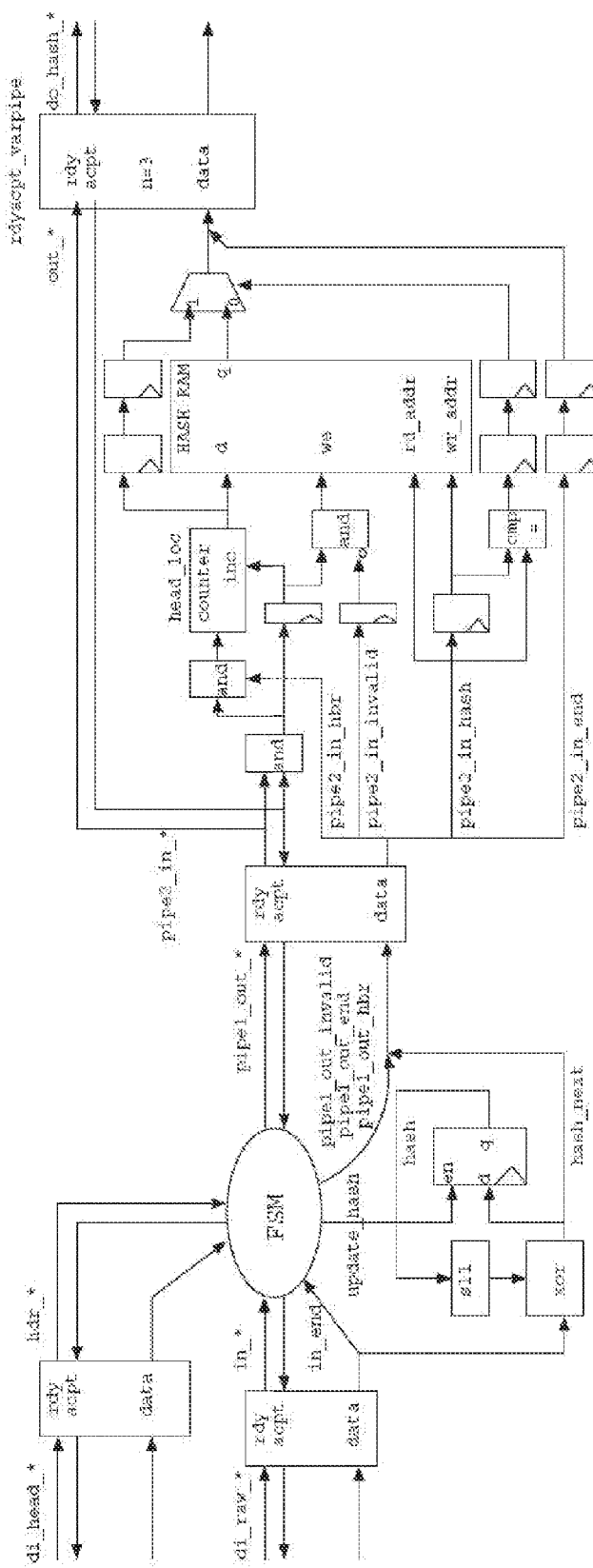
FIG. 2 is a block diagram of an example of a hash head device in accordance with an implementation of the disclosed system and methods.

As shown in FIG. 2, in some implementations, the functionality of this module may be divided into two sections: 1) generating the hash values; and 2) storing and/or sending hash head locations. In an exemplary implementation, rdyacpt ("ready accept") pipestage modules divide up these two sections: pipe1 and pipe2. The path between the input rdyacpt pipestage and the middle rdyacpt pipestage is referred to as pipe1 and comprises a finite state machine (FSM) to control data flow and a shift left function and an XOR function to implement the hashing function. The path between the middle rdyacpt pipestage and the output rdyacpt varpipe is referred to as pipe2 and comprises a counter to keep track of the current history buffer location and the hash head RAM which in this example, is with 2**HASH_BITS entries of width HISTORY_SIZE_BITS that maps hash values to the location in the history buffer when the same hash value was last seen.

Finite State Machine

Figure 3:
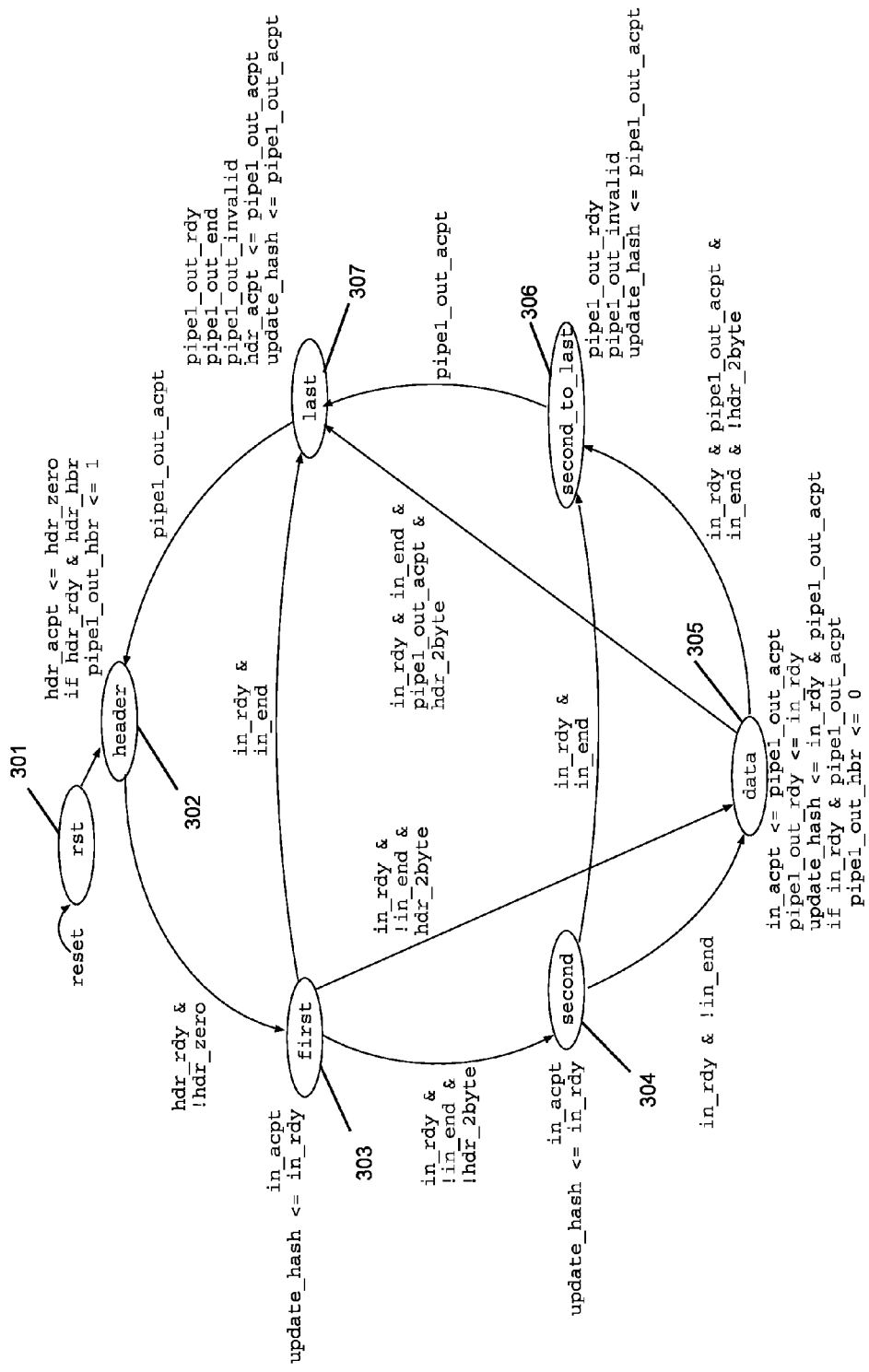
FIG. 3 is a block diagram of an implementation of a hash head generation control state machine in accordance with an implementation of a parallel hashing data compression system.

FIG. 3 shows an example of a main state machine, which is referred to as a Finite State Machine (FSM) for this module. The following provides a discussion of the activities occurring at the various states that are relevant to the FSM as organized by each respective state:

RST state 301: This indicates a reset state. When the reset state is not active, the process is instructed to move to the HEADER state.

HEADER state 302: This state ensures a handshake is executed for a header before any raw data is processed. If 'hdr_rdy' ("header ready") is active but the Zero Block bit of the header is one, this header will be ignored and the module will continue to wait for the next header to come in. If 'hdr_rdy' is active and the Zero Block bit is zero, the process moves to the FIRST state. The 'hdr_acpt' is only active in this state if the Zero Block bit is a one. The register 'pipe1_out_hbr' is set when a valid header has the HBR bit set, meaning that both Zero Block bits equal one or zero.

FIRST state 303: In this state, the first raw byte is accepted and 'in_acpt' is active. If 'in_rdy' becomes active, 'update_hash' is set. If both 'in_rdy' and 'in_end' are active, the process moves to the LAST state. If 'in_rdy' is active and 'in_end' is inactive and if 'hdr_2 byte' is one, the process goes to the DATA state. Otherwise, the process goes to the SECOND state.

SECOND state 304: In this state, the second raw byte is accepted and 'in_acpt' is active. If 'in_rdy' becomes active, 'update_hash' is set. If both 'in_rdy' and 'in_end' are active, the process goes to the SECOND_TO_LAST state. Otherwise, if 'in_rdy' is active and 'in_end' is inactive the process goes to the DATA state.

DATA state 305: This state processes and pass on data normally. Input rdy/acpt are hooked to pipe1_out rdy/acpt, respectively. Also, 'update_hash' is set and the register 'pipe1_out_hbr' is cleared when there is a handshake. When a handshake occurs and 'in_end' is active, if 'hdr_2 byte' is 1, the process goes to LAST state. Otherwise, the process goes to SECOND_TO_LAST state.

SECOND_TO_LAST state 306: This state sends out an invalid head hash for the second to last raw byte. Here, 'pipe1_out_rdy' is active and 'pipe1_out_invalid' is set to 1 indicating that the hash value being sent out is invalid and should not be written to the hash head RAM. If 'pipe1_out_acpt' becomes active, the process goes to the LAST state and sets 'update_hash' to 1.

LAST state 307: This state send out invalid head hash for the last raw byte. Here, 'pipe1_out_rdy' is active, 'pipe1_out_end' is set to 1, and 'pipe1_out_invalid' is set to 1 indicating that the hash value being sent out is invalid and should not be written to the hash head RAM. If 'pipe1_out_acpt' goes active, the process goes to the HEADER state and sets 'update_hash' and 'hdr_acpt' to 1.

Pipe1—Hashing Function

In some implementations, the 'hash' register is HASH_BITS wide and is used to keep around the previous hash so that the new hash for the current raw byte can be calculated. The new hash value 'hash_next' is generated by shifting the previous hash 'hash' left HASH_SHIFT places if 'hdr_2 byte' is 0 or HASH_SHIFT_2B places if 'hdr_2 byte' is 1 and applying an XOR operator with the incoming raw byte. The 'hash_next' value is only registered in 'hash' when the 'update_hash' signal is active. If the end of block is reached and there is no more raw data, the process generates the hash for the last bytes as if the input bytes were 0x00, which helps create a match to SW, but the process also sets 'pipe1_out_invalid' to 1 to indicate that these hash values are not to be written to the hash head RAM.

The following signals may then be passed through as data through the rdyacpt pipestage: 'hash_next', 'pipe1_out_invalid', 'pipe1_out_end', and 'pipe1_out_hbr'.

Pipe2—Hash Head Ram

In some implementations, pipe2 is actually split into two stages in order to avoid reading and writing to the same address in the RAM on the same clock. All the signals dealing with the write operation may be delayed by one clock-data, write enable, and write address. Here, the hash value is used as the read address of the hash head RAM and the hash value delayed one clock is the write address. The 'head_loc' counter holds the history buffer location of the current data and is the input data to be written to the Hash Head RAM. This counter is incremented whenever there was a pipe2_in handshake on the previous clock. If the value of the counter reaches one less than MAX_HISTORY_SIZE and is to be incremented, the counter is set to zero instead. If the History Buffer Reset bit passed with the data stream is set then this counter is set to zero. The delayed pipestage handshake also drives the write enable port of the Hash Head RAM when the delayed invalid flag is not active.

Each transferred di_hash_head value represents the first potential match location that needs to be searched and is the previous byte that had the same hash value as the newest byte of data to enter the compressor. This hash head value is the first location in the list of potential match locations for the transfer and will eventually be output on do_match_locs(0). A write pointer (wptr) is maintained which indicates the location in the history buffer where a new byte is going to be written. The write pointer (wptr) is incremented mod MAX_HISTORY_SIZE each time a hash head value is written and reset prior to data whenever a control header has the HBR set.

A comparator may be used to check if the write address and read addresses are the same. Both the 'head_loc' counter and a signal 'cmp' indicating if read and write addresses are the same are registered twice and passed around the RAM to line up with the next read data. If the twice registered 'cmp' is active, the process then passes on the twice registered 'head_loc' value instead of the output of the RAM. In some implementations, the hash head RAM is a registered two-port RAM.

Figure 4:
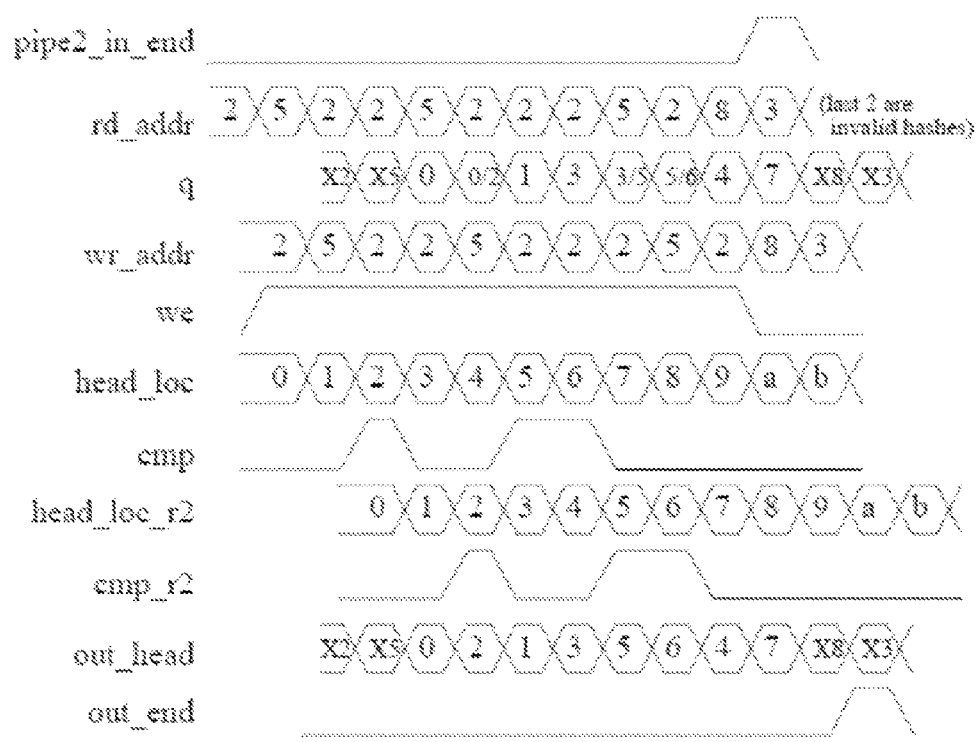
FIG. 4 provides an example of a timing diagram showing data flowing through a hash head random access memory (RAM) in accordance with an implementation of the disclosed system and methods.

A rdyacpt_varpipe module may be used on the backside of the hash head RAM to handshake out the hash head values read from the RAM. In order to line up the end flag with the data coming out of the RAM, the end flag must be registered twice. The rdyacpt_varpipe has its delay set to n=2 to match the RAM. FIG. 4 provides an example timing diagram of data flowing through/around the hash head RAM.

Hash Chain Generation in a Parallel Hashing Compressor

The Hash Chain Generation function provides for looking up potential match locations in parallel. In some implementations, first the hash chain lookup is parallelized by instantiating CHAIN_LENGTH−1 instances of the hash chain RAM where CHAIN_LENGTH is the number of potential match locations that will be checked in parallel. CHAIN_LENGTH, or the number of potential match locations that may be checked in parallel may comprise any appropriate number of potential match locations in the range of one to N number of possible match locations. The first instance of hash chain RAM takes the hash head as the address and looks up the second potential match location. On the next clock increment, the second instance looks up the third location, and so on. The list of potential match locations for a given hash head may then be synchronized and sent out after the last potential match location has been looked up. In this way, the hash chain lookup can stream out one list of match locations per clock.

The hash chain module provides a table, indexed by potential match location, containing the indices of the previous index that had the same hash value. This table can be read using the incoming hash head value to provide the previous location. That value can be used as the next address to find the next oldest (potential) match location, and so forth. Hence the contents form a linked list or chain. The table is populated by writing incoming hash head values sequentially in memory, and stored in a block called a hash chain RAM. In order to facilitate processing one match per clock, there are actually a cascade of hash chain RAMs 501, 502, 503, each containing essentially the same data, with the subsequent hash chain RAM taking a potential match location from the previous hash chain RAM and looking up one or more older locations. N number of hash chain RAMs provide N locations, or N+1 locations if the input hash head 500 is also included.

Figure 5:
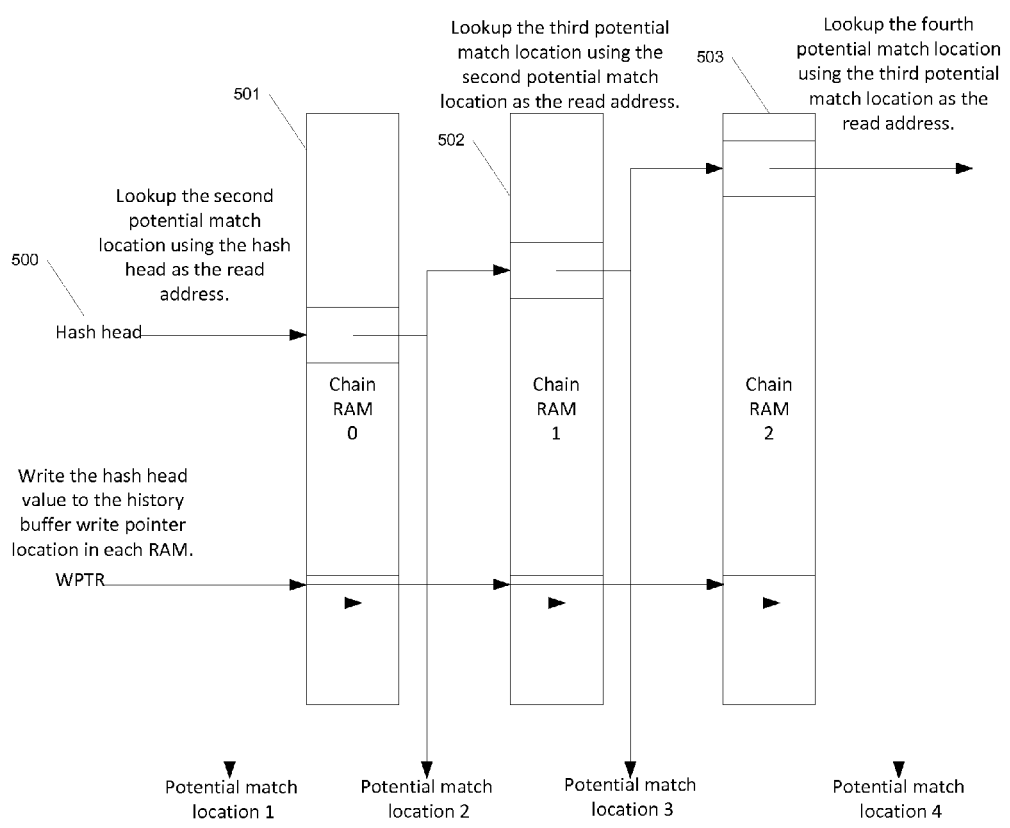
FIG. 5 provides an exemplary configuration of a parallel hash chain lookup module in accordance with an implementation of the disclosed system and methods.

FIG. 5 provides an example of a parallel hash chain lookup. As shown, the module receives a history buffer location of a potential match and outputs that location as well as up to 3*CHAIN_LENGTH−1 previous locations that had the same hash value. This input is also called a hash head 500. The incoming data contains the history index of the last byte to generate the same hash at the current byte. The number of samples since the last History Buffer Reset indicates the index of the current byte. Thus the input indirectly contains both the current and previous match location with the same sample.

In some implementations, the module handshakes in a segment header (di_head), then handshakes all of the data for that segment (di_hash). An exemplary format of the control header is described below under the heading "Control Header Description." Only the HBR, Zero Block, and Effort fields of the header are used in this example.

From reset, incoming entries are written sequentially into the hash chain RAMs starting at location zero. If the History Buffer Reset (HBR) is set, the data for the segment is written starting back at location zero. If HBR is clear, writes for the new segment continue after the last write of the previous segment. If Zero Block is set, there is no data associated with the block, no hash_head handshake occurs, and the module waits for another header. The value of the Effort field must be preserved for use by each hash chain RAM.

Low Effort

When the value of the Header Effort field is 0 or 1, the module inputs one di_hash_head transfer per clock. Each hash chain RAM looks up one potential match location per clock. Processing one sample may look like the following Pseudo-Perl example:

```
$do_match_locs [0]      = $hash_head ; # $hash head = di_hash_head.
$hash_chain0            = $hash_head
$chain_ram0 [$wptr]     = $hash_head;
$hash_chain1            = $chain_ram0[$hash _chain0];
$do_match_locs[1]       = $hash_chain1;
$chain_ram1 [$wptr]     = $hash_head;
$hash _chain2           = $chain_ram1[$hash_chain1];
$do_match_locs[2]       = $hash_chain2;
$chain_ram2 [$wptr]     = $hash_head;
.
.
.
$hash_chain7            = $chain_ram7[$hash_chain6];
$do_match_locs[7]       = $hash_chain7;
$chain_ram7 [$wptr]     = $hash_head ;
$wptr                   = ($wptr + 1) %$MAX_HISTORY_SIZE;
```

Hence if the input stream hashed to a repeating 1, 2, 3, 4, and the hash chain RAMs and earlier hash head RAM are initially all zero, the output would look like the following example:

| sample | hash | do_match_locs(0) | do_match_locs(1) | do_match_locs(2) | do_match_locs(3) |
|---|---|---|---|---|---|
| 0 | 1 | 0 | 0 | 0 | 0 |
| 1 | 2 | 0 | 0 | 0 | 0 |
| 2 | 3 | 0 | 0 | 0 | 0 |
| 3 | 4 | 0 | 0 | 0 | 0 |
| 4 | 1 | 0 | 0 | 0 | 0 |
| 5 | 2 | 1 | 0 | 0 | 0 |
| 6 | 3 | 2 | 0 | 0 | 0 |
| 7 | 4 | 3 | 0 | 0 | 0 |
| 8 | 1 | 4 | 0 | 0 | 0 |
| 9 | 2 | 5 | 1 | 0 | 0 |
| 10 | 3 | 6 | 2 | 0 | 0 |
| 11 | 4 | 7 | 3 | 0 | 0 |
| 12 | 1 | 8 | 4 | 0 | 0 |
| 13 | 2 | 9 | 5 | 1 | 0 |
| 14 | 3 | 10 | 6 | 2 | 0 |
| 15 | 4 | 11 | 7 | 3 | 0 |
| 16 | 1 | 12 | 8 | 4 | 0 |
| 17 | 2 | 13 | 9 | 5 | 1 |

The di_hash_head input in the table above is the same as do_match_locs(0) output, and omitted solely to make the table fit the above space. The last entry, sample 17, has a hash value of 2. That value last occurred at history index 13, 9, 5, and 1 respectively, and those are the do_match_locs(0 to 3) outputs respectively.

In some hardware implementations, and for low effort, each hash chain RAM receives a hash_chain[i], looks at that address in its hash chain RAM, then forwards that value to hash_chain[i+1] and the next hash chain RAM. The original hash_head value is written into each hash chain RAM at the same time as each read. The write pointer is piped along with hash_head inside each hash chain RAM to preserve its original value.

The value from each hash chain RAM must be aligned in parallel, then output on do_match_loc[0:CHAIN_LENGTH]. Values of do_match_loc[CHAIN_LENGTH+1: 3*CHAIN_LENGTH−1] are set to zero.

While ideally each hash chain RAM is MAX_HISTORY_SIZE deep, such a practice uses an excess of memory resources. In practice, the HISTORY_SIZE[i] package constant specifies gradually increasing hash chain RAM sizes, which may be desirable to be in powers of two. If MAX_HISTORY_SIZE is 32K, but the HISTORY_SIZE is only 4K, then data is written to (wptr mod 4K), as if the MAX_HISTORY_SIZE was only 4K. However, if the incoming hash_chain represents a value that is more than 4K back from the wptr (as seen in a modulo 32K world), then the hash block passes its hash_chain input to its hash_chain output and its match location output. This is called the "too far" case. While these values don't represent new potential matches, they won't slow down processing, and the hash_chain output will allow larger downstream histories to look up the match. Passing the input of the RAM to the output is also referred to as "Bypassing".

To make the hash chain RAM independent of whether a read and a write to the same RAM location reads the new or old data, the case may be treated such that the write pointer and the incoming hash_chain value are equal as if they were "too far" away. Finally, if the hash chain RAM read location has not yet been written to since the last History Buffer Reset, that read is also bypassed.

High Effort

In some implementations, when Effort is >=2, then the module only inputs a di_hash_head value every other clock cycle, but output 3*CHAIN_LENGTH potential match locations. Each hash chain RAM looks up three potential match locations before passing the last value to the next hash chain RAM. The following Pseudo-Perl demonstrates such an example:

```
$do_match_locs [0]    = $hash_head0; # $hash_head0 = di_hash_head
$hash_chain0          = $hash_head0;
$chain_ram1 [$wptr]   = $hash_head;
$hash_chain1              = $chain_ram1 [$hash_chain0];
$hash_chain2              = $chain_ram1 [$hash_chain1];
$hash_chain3              = $chain_ram1 [$hash_chain2];
$do_match_locs [1]    = $hash_chain1;
$do_match_locs [2]    = $hash_chain2;
$do_match_locs [3]    = $hash_chain3;
$chain_ram2 [$wptr]   = $hash_head;
$hash_chain4          = $chain_ram2 [$hash_chain3];
$hash_chain5          = $chain_ram2 [$hash_chain4];
$hash_chain6          = $chain_ram2 [$hash_chain5];
$do_match_locs [4]    = $hash_chain4;
$do_match_locs [5]    = $hash_chain5;
$do_match_locs [6]    = $hash_chain6;
```

In order to meet the input and output rates while performing three chained reads per sample, the third lookup for one sample needs to occur while processing the first or second cycle for the next sample. This is possible using a true two port RAM and interlacing the third read with the new write. The table below shows interaction of the first two hash chain RAMs for the first 11 clock cycles of compression block.

| Port | 1 | 2 | 3 | 4 | 5 | 6 | 7 | 8 | 9 | 10 | 11 |
|---|---|---|---|---|---|---|---|---|---|---|---|
| addr_a | WPTR0 |  | WPTR1 | H02 | WPTR2 | H12 | WPTR3 | H22 | WPTR4 | H32 | WPTR5 |
| data_a | H00 |  | H10 |  | H20 |  | H30 |  | H40 |  | H50 |
| q_a |  |  |  |  | H03 |  | H13 |  | H23 |  | H33 |
| addr_b | H00 | H01 | H10 | H11 | H20 | H21 | H30 | H31 | H40 | H41 | H50 |

-continued

| Port | 1 | 2 | 3 | 4 | 5 | 6 | 7 | 8 | 9 | 10 | 11 |
|---|---|---|---|---|---|---|---|---|---|---|---|
| q_b |  | H01 | H02 | H11 | H12 | H21 | H22 | H31 | H32 | H41 | H42 |
| addr_a |  |  |  |  | WPTR0 |  | WPTR1 | H05 | WPTR2 | H15 | WPTR3 |
| data_a |  |  |  |  | H00 |  | H10 |  | H20 |  | H30 |
| q_a |  |  |  |  |  |  |  |  | H06 |  | H16 |
| addr_b |  |  |  |  | H03 | H04 | H13 | H14 | H23 | H24 | H33 |
| q_b |  |  |  |  |  | H04 | H05 | H14 | H15 | H24 | H25 |

Sample Hxy refers to input sample x and chain position y. The above example sequence limits Port B to Read-only and Port A to only read on even clock cycles or write on odd clock cycles.

It is possible that the third read of sample N will be from the same location as the write of sample N+1. To avoid having the timing of input data affect the value of the output, and to avoid any dependency on how the RAM handles a read from and write to the same location, the third read is considered "too far" if its address is the same as the write pointer for the next sample, so the read is bypassed.

The following provides an example of such a control header description and exemplary requirements:

| HBR | (0) | History buffer reset. If set, history buffer is reset prior to accepting data for the new block |
|---|---|---|
| Context Data | (1) | This data is context data, output is dumped |
| Raw Only | (2) | When set the block size must be limited to Buffer Size raw bytes in all cases. |
| 2 byte | (3) | When set to one, it enables the compressor to allow two byte matches. |
| Zero Block | (4) | Zero Length Block. No data associated with the header. |
| History Size | (6 downto 5) | Used to control the history window size. The default is MAX<br>00 MAX<br>01 2 K<br>10 1 K<br>11 512 |
| Effort | (8 downto 7) | Compression effort, used to trade off speed for compression ratio.<br>00 Fastest<br>01 Reserved, maps to Fastest for now.<br>10 Reserved, maps to Best for now.<br>11 Best compression ratio |

The following is an example of possible requirements of this configuration offered as a non-limiting example:

1 Wait for a header for a non-zero block (ZB=0) before processing any hash head values.

2 If the header is for a zero block (ZB=1) accept the header and discard it.

3 Maintain a write pointer than increments for each incoming sample, is reset to 0 prior to data if HBR is set in the header, and wraps at MAX_HISTORY_SIZE.

4 Write hash head values to the address pointed to by the write pointer.

5 When Effort is 0 or 1, for each hash head received output a CHAIN_LENGTH+1 long list of potential match locations. Process a sample every clock.

6 When Effort is 2 or 3, for each hash head received output a 3*CHAIN_LENGTH long list of potential match locations. Process a sample every other clock.

7 Ignore Context Data, Raw Only, 2 byte, and History Size fields in the control header.

8 Process the next block with less than 10 clocks of downtime, regardless of present/next effort level.

9 Bypass hash chain RAM[i] and output its input if the hash chain is more than HISTORY_SIZES[i] samples behind the write pointer.

10 Bypass the hash chain RAM if a write of sample N could interfere with reads of sample N.

11 Bypass the hash chain RAM if the read address points to a location that has not been written since the last Reset/HBR.

12 In high effort mode, bypass the hash chain RAM if a write of sample N+1 could interfere with reads of sample N.

Figure 6:
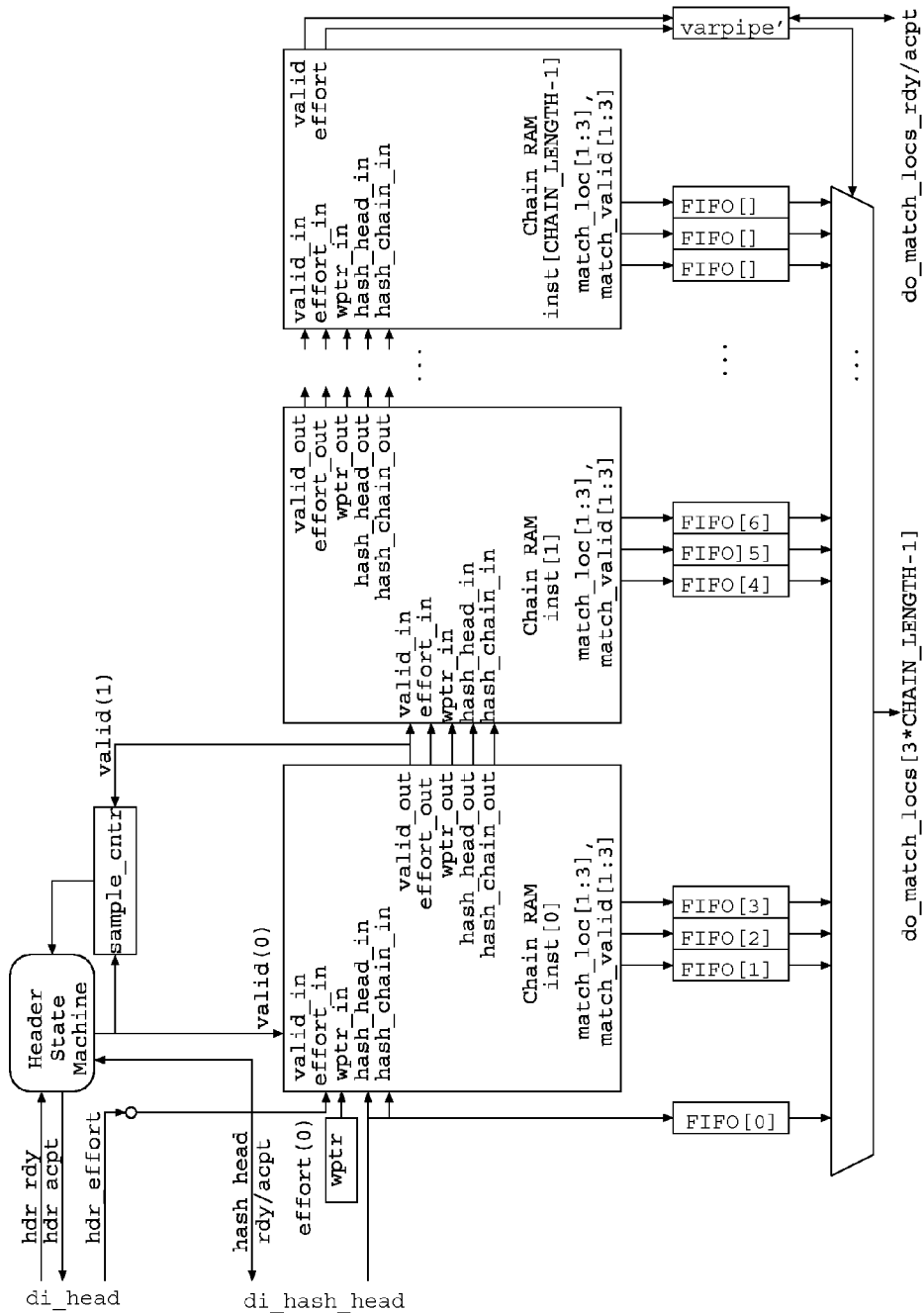
FIG. 6 is a block diagram of an example of a hash chain device in accordance with an implementation of the disclosed system and methods.

The datapath may comprise a rdyacpt for the header and another for data, a header state machine, a sample counter, write pointer, and an array of hash chain RAM instances, an example of which is depicted in the block diagram of FIG. 6. These may be followed by an array of FIFOs to store potential match locations and a single variable pipe storing the effort level of each input sample.

Header State Machine

Figure 7:
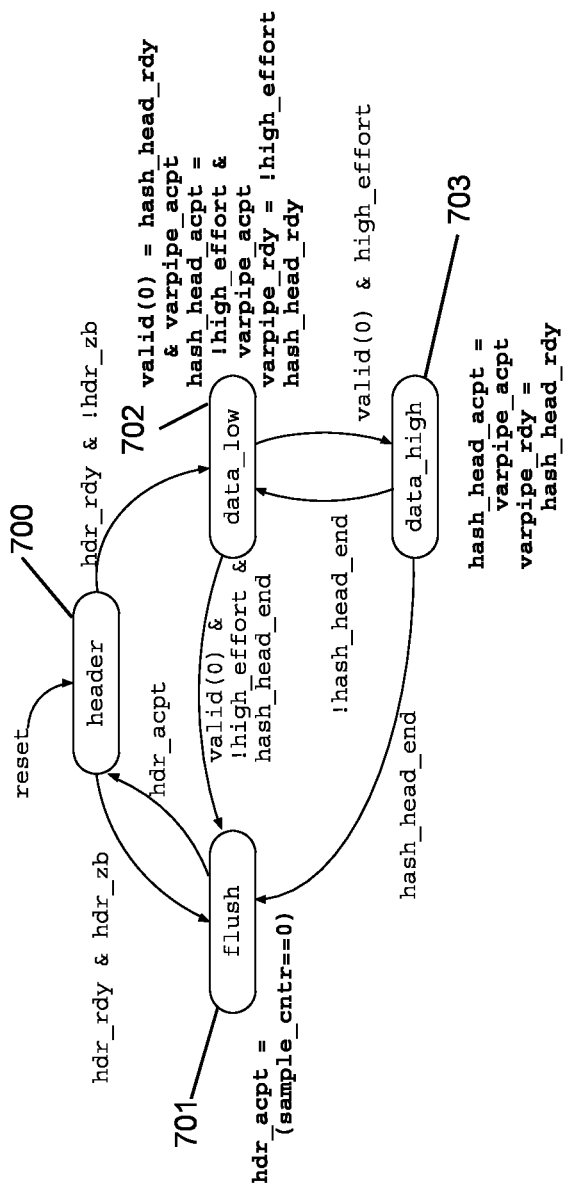
FIG. 7 is a block diagram of an implementation of a header state machine in accordance with an implementation of a parallel hashing data compression system.

The Header State Machine provides top-level control for the block. It has a header state 700 that waits for each header. If that header is for a Zero Block, the state transitions to a flush state 701 that acknowledges the header and repeats the process. If the header is for a non-zero block, the state machine moves to one or two data states. For low effort segments, a single data (low) state 702 is used to send data up to one sample per clock. For high effort segments, the state machine alternates between two data states, data low state 702 and data high state 703, to pace the rate to one sample every other clock. The hash head input data is accepted until a sample is flagged with an end flag. Then the state machine transitions to a flush state 701, acknowledges the header and the process starts over. FIG. 7 illustrates an example of a Header State Machine which provides top-level control for the block.

The individual states may comprise:

Header State 700: The process waits for a header but does not accept it. The process transitions to "data_low" 702 upon receiving a non-zero header and transitions to "flush" 701 upon receiving a zero-byte header. This is the reset state 700.

data_low 702: This state generates valid[0] when both the ready from the rdyacpt and the accept from the last variable pipe are active. If the header indicates a low effort block (hdr_effort<2), the process connects the hash_head_rdy to the ready on the variable pipe, and the accept from the variable pipe to the hash_head_acpt. The process transitions to "flush" 701 after handshaking a hash head flagged as the end of segment. If the header indicates a high effort block (hdr_effort>=2), the process immediately transitions to "data_high" 703 even for an end.

data_high 703: This state drives incoming data for a second clock, thus pacing the input and completes the handshake that was ready on the previous clock in "data_low" 702. The process connects the hash_head_rdy to the ready on the variable pipe and the accept from the variable pipe to the hash_head_acpt. The process transitions back to "data_low"

702 if the hash head is not flagged as the end of segment, or "flush" 701 if the hash head is flagged.

flush 701: The process waits until the first hash chain RAM no longer needs the effort field of the header, then accepts the header. The process waits until sample_cntr is zero (indicating the first hash chain RAM is empty), then issues a hdr_acpt and transitions to "header".

Data Path

The data path may comprise two input rdyacpts, the state machine described above, a sample counter, write pointer, and a cascade of hash chain RAM instances. These are followed by an array of FIFOs to store potential match locations. The daisy-chained signals are named such that the inputs to instance i are signal[i] and the outputs signal[i+1].

In one implementation, the header is split out into hdr_zb, hdr_hbr, and hdr_effort[1:0]. Since there are only two effective effort settings, a single effort[0] is set if hdr_effort>=2, then sent into the hash chain RAM pipeline.

The valid[0] is driven from the state machine. The Sample Counter is reset to 0, increments for each valid[0], and decrements for each valid[1]. Its range is the number of samples in a single hash chain RAM, hence 0 to 2. [0 to 3 if we add a pipe stage after each hash chain RAM].

The write pointer may have a range of 0 . . . MAX_HISTORY_SIZE−1 and is reset to zero. It is incremented modulo MAX_HISTORY_SIZE for each data sample transfer (hash_ready_rdy/acpt). The counter is reset if the incoming header is contains a history buffer reset (hdr_rdy & hdr_hbr) and the state machine is in the "header" state. The write pointer (wptr) drives the wptr_in of the first hash chain RAM instance.

The hash chain RAM Instances (0 . . . CHAIN_LENGTH−1), may be connected in a chain and output after a fixed latency as described below. This first instance has valid_in driven by valid[0] from the state machine, effort_in driven high whenever hdr_effort is greater than or equal to 2, and wptr_in from the writer pointer (wptr). All three of these values are daisy chained as valid[i], effort[i], and wptr[i].

The hash_head input data is connected to both the hash_head_in and hash_chain_in of the first instance. This same value is piped as hash_head[n] down the entire chain, whereas the hash_chain[n] chain contains progressively older potential match locations. The hash chain RAMs output three match_loc[n] values (with indices 1, 2, 3 representing the first, second, and third oldest match locations for the instance). These are marked valid with match_valid[n] flags. Match locations 1, 2, 3 of instance 0 are written into FIFOs 1, 2, 3. Match locations 1, 2, 3 of instance 1 are written into FIFOs 4, 5, 6 and so forth. FIFO[0] may be written with hash_head when valid[0] is active. Hence, in this manner, all potential match locations are written as they are discovered.

The last effort value in the chain may be written into a modified varpipe module. It is modified not to provide an internal fixed valid pipe, but to use the incoming valid [CHAIN_LENGTH] to actually write data. The input handshake is connected to the hash_head input rdyacpt, and described in the state machine section.

By the time an effort enters the varpipe, every FIFO which could contain a valid sample does contain one. Hence if the varpipe is ready, all of the relevant FIFOs are ready to output too. The output rdy/acpt of the varpipe is connected to the do_match_locs bus rdy/acpt.

For purely timing purposes, it may be advantageous to insert a pipe stage between each hash chain RAM instance or strictly speaking, on the output of each hash chain RAM. Normally, the output of the RAM in instance N−1 is passed to the input of RAM N. With the larger RAMs at the end of the chain, this has the potential to create timing problems. Adding a pipe stage (bank of flops) to the hash_chain output (and all of the control outputs such as wptr, effort, hbr, and valid) can increase maximum clock frequency. The pipe stages are not strictly needed at the start of the chain were RAMs are smaller, but the area is minimal compared to the RAMs themselves. The tradeoff is that the FIFOs need to increase in size from 4*CHAIN_LENGTH+2 to 5*CHAIN_LENGTH+2, and the sample counter range increases from 0 to 2 to 0 to 3.

Figure 8:
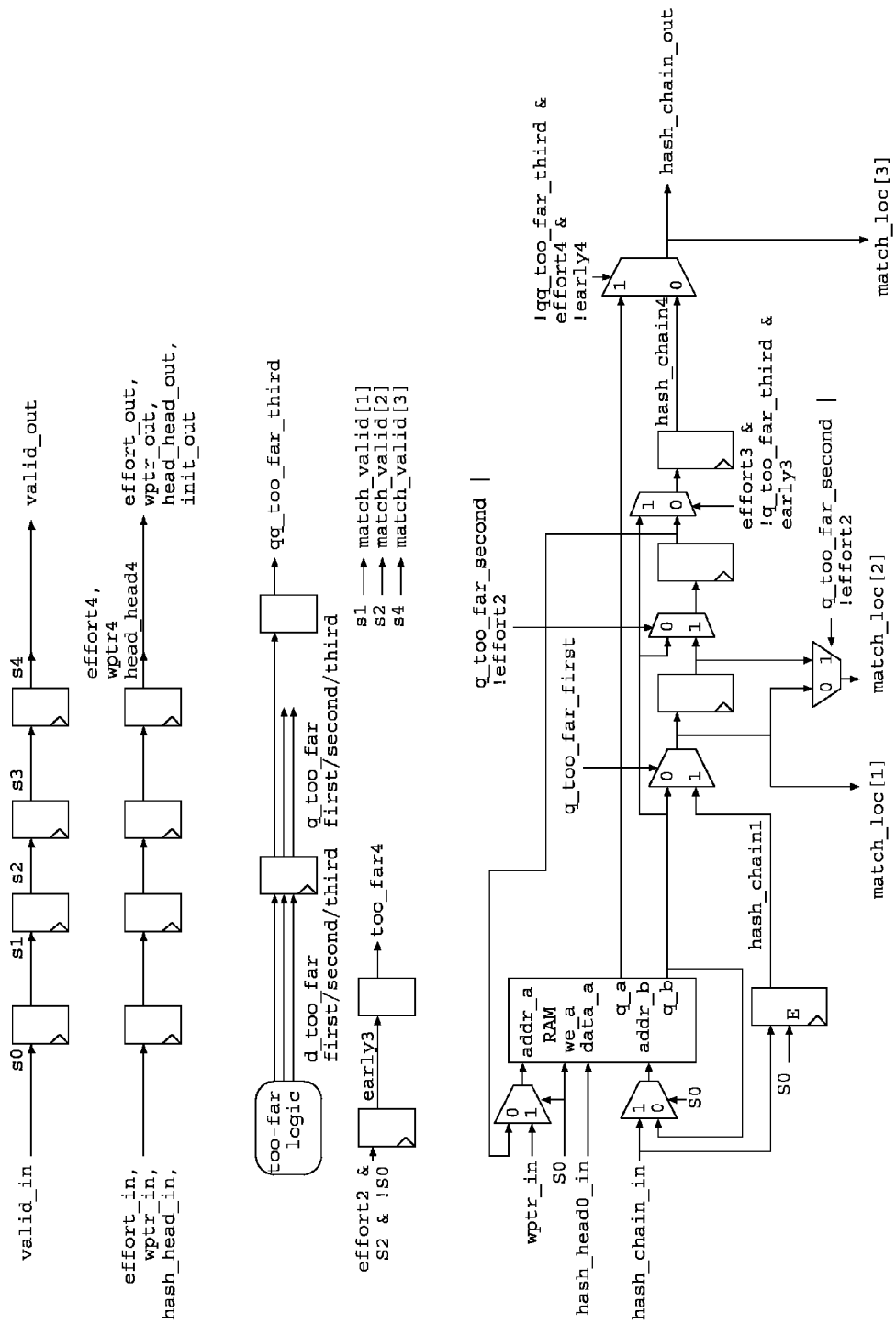
FIG. 8 is a block diagram of an example of a chain RAM device in accordance with an implementation of the disclosed system and methods.

In some implementations, the hash chain RAM performs all potential match location lookups. Each block maintains a constant latency and can be chained indefinitely. An example of a block diagram of a hash chain RAM is provided in FIG. 8.

In one implementation, the hash chain RAM may be set up as a four-stage pipeline. Data flows through the four stages regardless of effort level. While low effort segments could be processed with a single clock of latency, the latencies are matched to allow interlacing low and high effort segments within the pipeline.

A low-effort sample performs one read then pipes the resulting value three times (via hash_chain2,3,4) to provide the next chain output. A high-effort sample performs three reads over four clocks and outputs the last value to the next hash chain RAM after the 4th clock.

The valid_in signal is renamed S0 (for State 0), and then piped as S1, S2, . . . , S4 for internal use. S4 is exported as valid_out. S0 can be set every clock, hence the state pipeline typically has more than one state active.

The effort_in, wptr_in, and hash_head_in signals are piped (and named) in the same fashion as the valid flag. All high-effort control decisions are qualified by effort[N].

The too_far_depth_*, too_far_rw_*, and too_far_init_* signals respectively indicate the RAM should be bypassed due to the match being further back in the history than the RAM maintains, due to a read/write address collision, or because the location to be read has not yet been written. They are divided further into first, second, and third variants (e.g. too_far_depth_second), representing the fi, r, second, or third read from the chain RAM. In low effort mode, only the "first" signals are used.

The RAM is sized DEPTHxHASH_HISTORY_BITS. The RAM has one read/write port (A) and one read port (B). The address registers are all HISTORY_SIZE_BITS, but only the lower bits are connected to the RAM (i.e. the addresses are modulo DEPTH). Port A is written with hash_head_in every time S0 is active.

In S0, Port B makes a read request from hash_chain_in. In S1 high effort, if the first read is bypassed (q_too_far_first), Port B reads the bypassed value from hash_chain1.

In S2 high effort, if the second read is bypassed (q_too_far_second), Port B reads the bypassed value from hash_chain2. In all other cases, Port B reads from the Port B output.

Port A makes a late third read request in high effort mode when the next sample arrives two clocks after the current, or in other words, when the design is streaming. More specifically it makes a read request during S3 from the location that was the Port B Q output during S2. Fortunately, this information is preserved in the hash_chain3 register. The read has to be delayed because S0 performs a write during the natural time to perform the read.

Early reads are detected by Seeing S2 and effort2 but not S0, and registering that value as early3. That signal routes the output during S3 into hash_chain4, and forces the input of too_far4 active to mux the data out to match_loc[3] and hash_chain_out during S4. Non-early reads take places in S3 and the RAM output is directly multiplexed out during S4. An incoming write during S2 prevents early reads. In high effort mode, only the third read needs to reach hash_chain_out. Early4 may comprise a piped version of early3.

The hash_chainN pipeline serves several purposes, a non-limiting list of which is provided as follows: 1) it pipes output data in low-effort mode to match high-effort latency, using hash_chain2,3,4; 2) it preserves hash_chain input values in case we need to bypass the RAM output; 3) hash_chain1 is only loaded during S0 to preserve its value into S2 for high effort third-read rw exception detection; 4) hash_chain2 stores the output of the second RAM read for one clock in the streaming case; 5) hash_chain4 stores the output of the third high-effort read for one clock in the non-streaming early read case.

All of the RAM address inputs may be used modulo DEPTH. For each lookup attempted by the hash chain RAM, there are three conditions that can trigger bypassing the RAM and passing its input to its output. These are:

1) Reading a location that has not been written. The upstream blocks can create this condition. This condition is detected when the read address is greater than the write pointer and the write pointer has not yet wrapped within the RAM. Wrapping is detected by an init_first/second/third flag that is cleared by reset, cleared by hbr_in, hbr1, hbr2 respectively, and set after writing the last location in the RAM (S0&wptr_in=(DEPTH−1)), (S1&wptr1=(DEPTH−1)), and S2&wptr2=(DEPTH−1). For the first read, hash_chain_in is compared to wptr_in. For the second read, match_loc1 is compared to wptr1. For the third read, match_loc2 is compared to wptr2. These conditions are named too_far_init_first/second/third.

2) Reading the same location as it is being written. The RAM input address needs to be passed to the output whenever the read and write locations are the same. For the first read, wptr_in is compared with hash_chain_in. For the second read, wptr1 is compared with match_loc1. For the third read, wptr2 is compared with match_loc2. For the third read, wptr1 is also compared with q_b. In this last case, potential collisions mau be avoided between the third read and the write of the next sample. These conditions are indicated by too_far_rw_first/second/third/third2. All are qualified by state S0, S1, S2.

3) Reading a location that is further back than the DEPTH of the RAM. The RAM input address needs to be passed to the output whenever it is trying to read a location further back than the DEPTH of the RAM. This is done by subtracting the read value from the write pointer modulo the maximum history size. The following expressions ensure no intermediate values go negative: too_far_depth_first=((((wptr_in+MAX_HISTORY_SIZE)−hash_chain_in) mod MAX_HISTORY_SIZE)>DEPTH) too_far_depth_second=((((wptr1+MAX_HISTORY_SIZE)−match_loc1) mod MAX_HISTORY_SIZE)>DEPTH) too_far_depth_third=((((wptr2+MAX_HISTORY_SIZE)−match_loc2) mod MAX_HISTORY_SIZE)>DEPTH).

It should be noted that for a maximum size (for example, a 32K) RAM, this comparison will never evaluate true. Each of the three or four bypass conditions for each read are OR'd into d_too_far_first/second/third and registered as too_far_first/second/third. Finally, if the third read comes early, the data will be available on the RAM during S3. As long as the third read wasn't considered too-far by earlier logic the read data is multiplexed into hash_chain4 (during S3). The third read is then output during S4 from hash_chain4, as if it was too far. The match_valid[1]/2/3 are driven from S1, S2, and S4 respectively. As all of the FIFOs are read regardless of effort level, there is no need to qualify the writes.

FIFOs and Variable Pipe

Each match location comes out of the hash chain RAM at a different clock cycle. One approach is to instantiate a vast sea of registers to re-align the samples to then dump them all into a big wide variable pipe. However, it is really only necessary to keep track of valid data through the entire chain, the value of the effort for a particular sample, and to store the samples in sufficiently large FIFOs.

Each FIFO may be written when the hash chain RAM flags a corresponding match_loc[n] with match_valid[n]. The effort_out from the last hash chain RAM is stored in a modified varpipe. The input handshake of the varpipe is described above. The output of the varpipe drives the output rdy/acpt (do_match_locs).

The hw_lib common varpipe block assumes a fixed length pipe and provides an internal chain of valid flags to parallel the external fixed pipe data. Since the hash chain RAM already implements a valid pipeline and because it may be preferable to utilize a system where the latency varies based on effort level thereby requiring flushing all or most old data, in some implementations, the varpipe must use the external valid pipe to flag when to store effort data inside the variable pipe. The standard varpipe.vhd is copied to a hash_chain_varpipe.vhd and a valid input added to indicate when data should be written into the varpipe's internal storage. All other logic remains the same in this implementation.

In the illustrative example described herein, the depth of the variable pipe is 5*CHAIN_LENGTH. This is set by the low-effort case, where there can be four samples in each hash chain RAM, not the 2 samples from the high-effort case. The pipe stage added for timing makes the total five. Each FIFO is (5*CHAIN_LENGTH+2)×(HASH_HISTORY_BITS). The depth matches the storage internal to the variable pipe (which is N+2). N+1 is used to buffer the output of the fixed pipe and N+2 is used to do so without creating a combinational path through the varpipe.

When the varpipe is outputting a low-effort sample, do_match_locs[0] is connected to FIFO[0]. Additionally, do_match_locs[i] is connected to the FIFOs fed by inst[i+1].match_loc[1] (for i in 1 . . . CHAIN_LENGTH). All other do_match_locs are set to zero. Accordingly, CHAIN_LENGTH+1 possibly has non-zero outputs.

When the varpipe is outputtting a high-effort sample, do_match_locs[0] is still connected to FIFO[0] and do_match_locs[i] are connected to the FIFOs fed by inst[i/3+1].match_loc[i%3+1]. All FIFOs may then be read in parallel regardless of effort level since all are written regardless of effort level. It should be noted that for CHAIN_LENGTH=8, the output of the very last FIFO of the last chain instance is never used. This FIFO and some of the logic inside the last instance may be removed by synthesis.

The large number of flops and complexity of the hash chain RAM is a direct result of supporting the interleaving of high and low effort segments. If the pipeline were allowed to flush all samples before changing effort modes, then the wptrN and hash_headN flops could be cut from four stages to two stages that update every other clock. Also, two of the registers on the output of the RAM could be eliminated retaining one solely to feed back to the RAM input, since the latencies would no longer need to match. The FIFO depths may also be cut in half since there would only ever be two samples in a given hash chain RAM.

Figure 9:
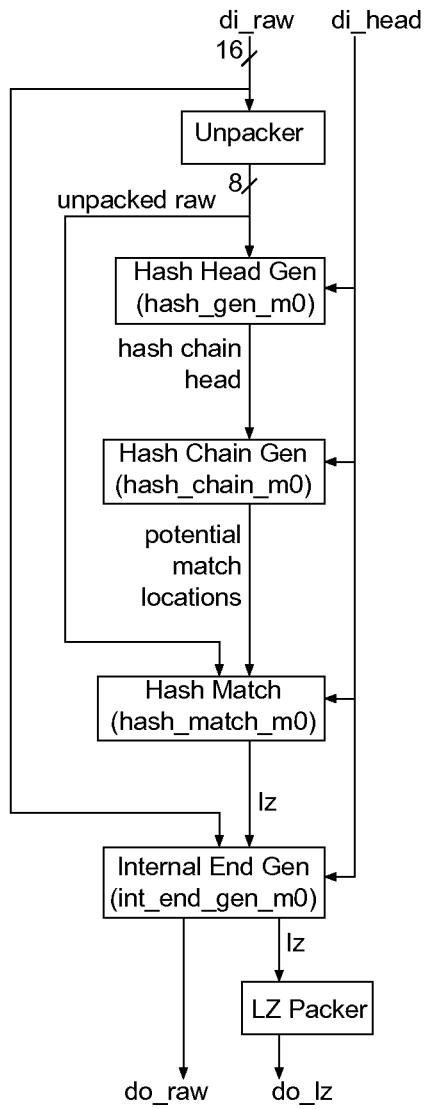
FIG. 9 is a block diagram of an example of an implementation of a parallel hashing LZ compression system.

FIG. 9 provides a block diagram of an implementation of a parallel hashing LZ compressor in which a stream of bytes is input and the compressor outputs an LZ compressed representation of the data. In this example, compression is done at one byte per clock using a parallelized hash-based string matching engine. The following port descriptions may be used in one such implementation of a parallel hashing compressor architecture:

System Ports:

clk: In std_logic: System clock in which only the rising edge is used.

reset: In std_logic: Reset, which is Active high and synchronous to clk.

Raw Data Input Ports:

di_raw_rdy: in std_logic: Raw data ready. Active high such that when active, indicates all data ('di_raw_*') on the port is valid. All information on the port is transferred on the rising edge of clk when both di_raw_rdy and di_raw_acpt are active.

di_raw_acpt: out std_logic: Raw data accept. Active high such that when active, indicates that this module can accept data on this port. All information on the port is transferred on the rising edge of clk when both di_raw_rdy and di_raw_acpt are active.

di_raw_data: in std_logic_vector(15 downto 0): Raw data. Valid on the rising edge of clk when di_raw_rdy is active.

di_raw_valid: in std_logic: Upper byte Valid. Active high. Valid on the rising edge of clk when di_raw_rdy is active. When active, the upper byte of di_raw_data contains valid data and two bytes are transferred. When inactive, only one byte is transferred in the lower 8 bits of di_raw_data.

di_raw_end: in std_logic: Raw data end. Valid on the rising edge of clk when di_raw_rdy is active. When active, the current transfer is the last byte of the compression segment.

Header Input Ports:

di_head_rdy: in std_logic: Header data ready. Active high. When active, indicates all data ('di_head_*') on the port is valid. All information on the port is transferred on the rising edge of clk when both di_head_rdy and di_head_acpt are active.

di_head_acpt: out std_logic: Header data accept. Active high. When active, indicates that this module can accept data on this port. All information on the port is transferred on the rising edge of clk when both di_head_rdy and di_head_acpt are active.

di_head_data: in std_logic_vector(8 downto 0): Header data. Transfers occur on the rising edge of clk when both rdy and acpt are active.

Raw Data Output Ports:

do_raw_rdy: out std_logic: Raw data ready. Active high. When active, indicates all data ('do_raw_*') on the port is valid. All information on the port is transferred on the rising edge of clk when both do_raw_rdy and do_raw_acpt are active.

do_raw_acpt: in std_logic: Raw data accept. Active high. When active, indicates that the receiving module can accept data on this port. All information on the port is transferred on the rising edge of clk when both do_raw_rdy and do_raw_acpt are active.

do_raw_data: out std_logic_vector(15 downto 0): Raw data. Valid on the rising edge of clk when do_raw_rdy is active.

do_raw_valid: out std_logic: Upper byte Valid. Active high. Valid on the rising edge of clk when do_raw_rdy is active. When active the upper byte of do_raw_data, contains valid data and two bytes are transferred. When inactive, only one byte is transferred in the lower 8 bits of do_raw_data.

do_raw_end: out std_logic: Raw data end. Valid on the rising edge of clk when do_raw_rdy is active. When active, the current transfer is the last byte of the compression block.

do_raw_int_end: out std_logic: Raw data internal end. Valid on the rising edge of clk when do_raw_rdy and do_raw_end are active. When active, the current compression block was terminated internally and more data will be output for the compression segment.

LZ Data Output Ports:

do_lz_rdy: out std_logic: LZ data ready. Active high. When active, indicates all data ('do_lz_*') on the port is valid. All information on the port is transferred on the rising edge of clk when both do_lz_rdy and do_lz_acpt are active.

do_lz_acpt: in std_logic: LZ data accept. Active high. When active, indicates that the receiving module can accept data on this port. All information on the port is transferred on the rising edge of clk when both do_lz_rdy and do_lz_acpt are active.

do_lz_type1: out std_logic_vector(1 downto 0): LZ data1 type. Transfers occur on the rising edge of clk when both rdy and acpt are active. Indicates the type of data on the data1 bus. 0 indicates literal, 1 a length, 2 a distance, and 3 is undefined.

do_lz_data1: out std_logic_vector(14 downto 0): LZ match data1 output bus. Transfers occur on the rising edge of clk when both rdy and acpt are active. Contains a distance, length, or literal as indicated by the do_lz_type bits.

do_lz_type2: out std_logic_vector(1 downto 0): LZ data2 type. Transfers occur on the rising edge of clk when both rdy and acpt are active. Indicates the type of data on the data2 bus. 0 indicates literal, 1 a length, 2 a distance, and 3 no data.

do_lz_data2: out std_logic_vector(14 downto 0): LZ match data2 output bus. Transfers occur on the rising edge of clk when both rdy and acpt are active. Contains a distance, length, or literal as indicated by the do_lz_type bits.

do_lz_end: out std_logic: LZ block end. Active high. Transfers occur on the rising edge of clk when both rdy and acpt are active. When active, the current transfer is the last transfer of the block.

The following provides an example of a control header description as used in an implementation of a parallel hashing compressor:

| HBR | (0) | History buffer reset. If set, history buffer is reset prior to accepting data for the new block. |
|---|---|---|
| Context Data | (1) | This data is context data, output is dumped |
| Raw Only | (2) | When set the block size must be limited to Buffer Size raw bytes in all cases. |
| 2 byte | (3) | When set to one, it enables the compressor to allow two byte matches. |
| Zero Block | (4) | Zero Length Block. No data associated with the header. |
| History Size | (6 downto 5) | Used to control the history window size. The default is MAX<br>00 MAX<br>01 2 K<br>10 1 K<br>11 512 |
| Effort | (8 downto 7) | Compression effort, used to trade off speed for compression ratio.<br>00 Fastest<br>01 Reserved, maps to Fastest for now.<br>10 Reserved, maps to Best for now.<br>11 Best compression ratio |

Hash Match Checking with Lazy Matching in a Parallel Hashing Compressor

In order to process one byte per clock the history buffer RAM must be able to check all potential match locations in parallel. To accomplish this CHAIN_LENGTH history buffer RAMS are instantiated. When a list of potential match locations arrives from the hash chain generation, one is assigned to each history buffer. In some implementations, in one clock, four bytes are read from each potential match location and compared to the incoming data. This is enough to determine if a minimum length match starts at any of the locations. If no matches start then on the next clock, a new list of potential match locations can be checked and a literal is output. If one or more potential match locations have a minimum length match, the match address is incremented on each clock and one more byte is checked on each clock until all of the matches end and the best one is selected and output. Lazy matching can be supported in this scheme as well. After a match has started, the next list of potential matches can also be checked since they will be potential lazy matches. Either they can be checked by instantiating another set of history buffer RAMs, or by checking two bytes per clock and alternating between checking the original matches on one clock and the lazy matches on the next clock. Accordingly, this implementation makes the best use of the RAM resources.

Not only can lazy matching help increase the compression ratio of CAM-based compressors it may also have such an advantage when used with a parallel hashing compressor. Lazy matching may be implemented in a manner that doesn't result in a throughput hit or significant increase in area for the three byte minimum match length case which is used in Deflate. In some implementations, the history buffer is searched for primary matches of three bytes or more. When a primary match is found, the state machine then switches to a mode in which the potential primary and lazy matches are evaluated on alternating clocks at two bytes at a time until the longest match is determined. Evaluating matches at two bytes on every other clock allows for the implementation of lazy matching without adding any more history buffer RAM.

Figure 10:
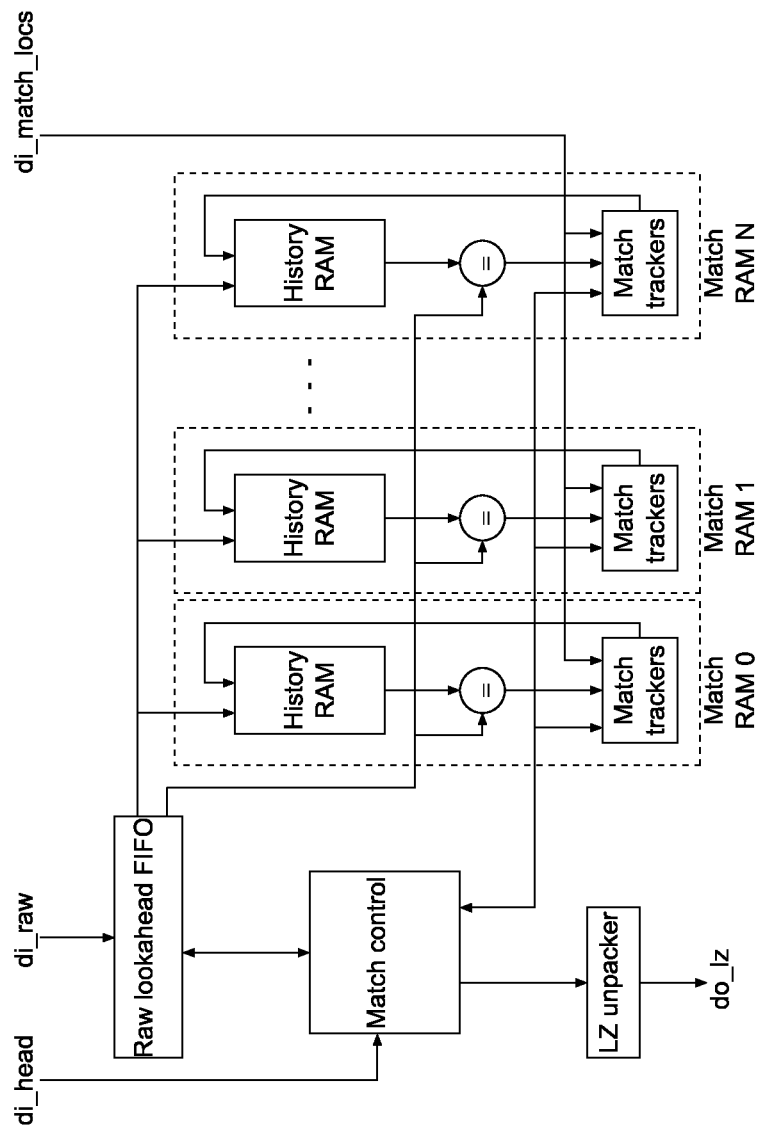
FIG. 10 is a block diagram of an example of an implementation of parallel history buffers in a system for parallel hashing data compression using lazy matching.

FIG. 10 provides a block diagram of an implementation of history buffer matching in a parallel hashing compressor utilizing lazy matching. As shown, this module takes raw data one byte at a time and a list of potential match locations for each byte of data. It maintains a sliding window history buffer of the data and compares the incoming data to the data at history buffer locations of potential matches. When no minimum length match is found the raw byte is output as a literal and when one or more matches are found, the longest one is found and output as a length/distance pair.

An example of an implementation of package constants and port descriptions is provided below for exemplary purposes:

Package Constants
common_lib.hash_pkg.MAX_MATCH: natural:=258 Maximum match length.
common_lib.hash_pkg.HISTORY_SIZE_BITS: natural:=15 Number of bits used to specify the history buffer size and the size of the pointers into the history buffer. The history buffer will be 2**HISTORY_SIZE_BITS. Default is 15 for a 32K history buffer which is the max supported by deflate.
common_lib.hash_pkg.MAX_HISTORY_SIZE: natural:=2**HISTORY_SIZE_BITS Size of the largest history buffer,
also the maximum match distance.
common_lib.hash_pkg.HISTORY_SIZES: history_size_t:=(4096, 4096, 4096, 4096, 4096, 8192, 16384, 32768) Sizes of the asymmetrically sized history buffers. Ordered from smallest to largest. The size of this array also determines how many history buffers are instantiated and consequently how many potential matches can be checked in parallel.
common_lib.hash_pkg.CHAIN_LENGTH: natural:=HISTORY_SIZES'length Number of potential match locations that can be checked in parallel in low effort mode, equal to the number of history buffers instantiated.

Port Descriptions
System:
clk: in std_logic; System clock. Only the rising edge is used.
reset: in std_logic; Reset. Active high. Synchronous to clk.
Raw Data Input Port:
di_raw_rdy: in std_logic; Raw data ready. Active high. When active, indicates all data ('di_raw_*') on the port is valid. All information on the port is transferred on the rising edge of clk when both di_raw_rdy and di_raw_acpt are active.
di_raw_acpt: out std_logic; Raw data accept. Active high. When active, indicates that this module can accept data on this port. All information on the port is transferred on the rising edge of clk when both di_raw_rdy and di_raw_acpt are active.
di_raw_data: in std_logic_vector(7 downto 0); Raw data. Valid on the rising edge of clk when di_raw_rdy is active.
di_raw_end: in std_logic; Raw data end. Valid on the rising edge of clk when di_raw_rdy is active. When active, the current transfer is the last byte of the compression segment.
Header Input Port:
di_head_rdy: in std_logic; Header data ready. Active high. When active, indicates all data ('di_head_*') on the port is valid. All information on the port is transferred on the rising edge of clk when both di_head_rdy and di_head_acpt are active.
di_head_acpt: out std_logic; Header data accept. Active high. When active, indicates that this module can accept data on this port. All information on the port is transferred on the rising edge of clk when both di_head_rdy and di_head_acpt are active.
di_head_data: in std_logic_vector(8 downto 0); Header data. Transfers occur on the rising edge of clk when both rdy and acpt are active.
Match Locations Input Port:
di_match_locs_rdy: in std_logic; Match locations ready. Active high. When active, indicates all data ('di_match_locs_*') on the port is valid. All information on the port is transferred on the rising edge of clk when both di_match_locs_rdy and di_match_locs_acpt are active.
di_match_locs_acpt: out std_logic; Match locations accept. Active high. When active, indicates that this module can accept data on this port. All information on the port is transferred on the rising edge of clk when both di_match_locs_rdy and di_match_locs_acpt are active.
di_match_locs: in match_loc_array_t(0 to (3*CHAIN_LENGTH)−1); Potential match location array. A list of history buffer addresses to search for potential matches. Index 0 is the location of the closest potential match, index 1 the second closest, etc. Transferred on the rising edge of clk when di_match_locs_rdy and di_match_locs_acpt are active.
LZ Output Port:
do_lz_rdy: out std_logic; LZ data ready. Active high. When active, indicates all data ('do_lz_*') on the port is valid. All information on the port is transferred on the rising edge of clk when both do_lz_rdy and do_lz_acpt are active.
do_lz_acpt: in std_logic; LZ data accept. Active high. When active, indicates that the receiving module can accept data on this port. All information on the port is transferred on the rising edge of clk when both do_lz_rdy and do_lz_acpt are active.

do_lz_type: out std_logic_vector(1 downto 0); LZ data type. Transfers occur on the rising edge of clk when both rdy and acpt are active. Indicates the type of data on the data bus. 0 indicates literal, 1 a length, and 2 a distance. Matches will always be transferred in two transfers, the first being the length and the second being the distance.

do_lz_data: out std_logic_vector(14 downto 0); LZ match data output bus. Transfers occur on the rising edge of clk when both rdy and acpt are active. Contains a distance, length, or literal as indicated by the do_lz_type bits.

do_lz_end: out std_logic; LZ block end. Active high. Transfers occur on the rising edge of clk when both rdy and acpt are active. When active, the current transfer is the last transfer of the block.

As shown above, before accepting data for a new block on the di_raw and di_match_locs ports, in some implementations, the module must handshake in a control header. An exemplary format of the control header is described below:

| Control header description: | | |
|---|---|---|
| HBR | (0) | History buffer reset. If set, history buffer is reset prior to accepting data for the new block. |
| Context Data | (1) | This data is context data, output is dumped |
| Raw Only | (2) | When set the block size must be limited to Buffer Size raw bytes in all cases. |
| 2 byte | (3) | When set to one, it enables the compressor to allow two byte matches. |
| Zero Block | (4) | Zero Length Block. No data associated with the header. |
| History Size | (6 downto 5) | Used to control the history window size. The default is MAX<br>00 MAX<br>01 2 K<br>10 1 K<br>11 512 |
| Effort | (8 downto 7) | Compression effort, used to trade off speed for compression ratio.<br>00 Fastest<br>01 Reserved, maps to Fastest for now.<br>10 Reserved, maps to Best for now.<br>11 Best compression ratio |

The following is an example of possible requirements of this configuration offered as a non-limiting example:

1. Wait for a control header with Zero Block==0 before processing any data.

2. After processing a block of data, wait for another control header with Zero Block==0 before accepting more data.

3. When a control header has Zero Block==1, wait for another control header before processing the next block.

4. Start with history buffer location 0 after a reset.

5. Return to history buffer location 0 when a control header is received with HBR set.

6. Increment history buffer location by 1 for each byte rolling over to 0 after one less than the history size specified in the control header or MAX_HISTORY_SIZE-1 for MAX.

7. Maintain MAX_HISTORY_SIZE of history data.

8. Protect the history RAMs with a parity bit. Write a parity bit for each byte to the RAM, when reading do a 9 bit compare between the data read from the RAM and the raw data, a flipped bit will result in a match termination.

9. Receive lists of potential match locations on the di_match_locs port and compare the incoming data to the history data at the potential match locations to find the lengths of the matches.

10. Track a set of lazy matches that can start one byte after another potential match.

11. If no minimum length match is found output the raw byte as a literal. If one or more matches are found output the longest one. In the case of a tie output the one closest to the front of the match location list.

12. If a lazy match is longer than the original match then output a raw byte for the original match and then the lazy match.

13. Keep accepting match location lists while determining the length of a match but ignore the list if there is a match in progress already.

14. Support two byte minimum match length when 2 byte is 1 in the control header.

15. Support three byte minimum match length when 2 byte is 0 in the control header.

16. Ignore three byte matches that have a match distance greater than 4096.

17. Ignore matches that have a distance greater than the history size specified in the control header.

18. Output matches on the do_lz port as length, distance pairs with the length first.

19. When Effort in the control header is 0 or 1, process one di_raw, di_match_locs pair per clock and check CHAIN_LENGTH potential match locations.

20. When Effort in the control header is 2 or 3, process one di_raw, di_match_locs pair every other clock and check 3*CHAIN_LENGTH potential match locations.

As shown above, if HBR is set in the header, then the history buffer is being reset before processing the new block of data and the history buffer location counter must be reset to 0 since the first byte of the new block will be written into history buffer location 0. If Zero Block is set then there is no data associated with the block and the module must wait for another control header. In such an implementation, the values of the 2 byte, History Size, and Effort fields must be registered for use while processing the block.

For each raw data byte transferred on the di_raw port, one list of potential match locations will be transferred on the di_match_locs port. Data accepted on the di_raw port goes into a four byte deep raw look ahead FIFO. This FIFO must be full (or contain a byte with an end flag set) in order for data to be accepted on the di_match_locs port. The raw look ahead FIFO is used to compare data read from the potential match locations in the history buffer to the incoming data stream to find matches.

When compression effort in the control header is set to low, transfers from di_match_locs can happen on every clock. There are CHAIN_LENGTH history buffer RAMs, each with a depth of HISTORY_SIZES(I) where I is the index of the RAM instantiation 0 to CHAIN_LENGTH-1. When a transfer is accepted from di_match_locs, one potential match location is sent to each history buffer RAM as a read address. Four bytes are read from each RAM starting at the potential match location address and compared to the raw look ahead buffer. If, for any of the potential match locations being checked, all 4 bytes match, 3 bytes match and the potential match location has a match distance of less than 4096, or 2 bytes match and 2 byte is set in the control header, then one or more matches have started. Each potential match location has an associated match length counter. Counters for the matches that start are set to 2, the others are set to 0. If no potential match locations result in a match starting, then a literal is output on the do_lz port and the process repeats with the next set of potential match locations. If one or more matches start, then on the next clock the same process happens with the next transfer from di_match_locs, but these will be considered potential lazy matches and will be tracked by another set of match length registers. On subsequent clocks, the module alternates between checking two more bytes of the potential matches and two more bytes of the potential lazy matches. While checking these matches, transfers are still accepted on di_match_locs, but the data is tossed since the module is already tracking matches. This continues until all potential matches and potential lazy matches terminate or reach MAX_MATCH match length. At that time, the best match is selected to be output on the do_lz port length first and then distance. The longest match is selected, if there is a tie between multiple matches, the non-lazy match takes priority as does the one with the least match distance (lowest index in the list of potential match locations).

For each clock, a list of potential match locations is processed, the oldest byte shifted out of the raw look ahead FIFO is written into all of the history buffer RAMs at the location pointed to by the write pointer (WPTR) mod the size of the history buffer RAM. WPTR is incremented for each byte written to the history buffer RAMs and rolls over to 0 after MAX_HISTORY_SIZE−1.

The case for high compression effort is similar, but there will be three times as many potential match locations to track and di_match_locs will be accepted every other clock. On the first clock, the first ⅔ of the potential match locations will be checked by reading data from two potential match locations per RAM using two read ports. On the next clock, the last ⅓ of the potential match locations will be checked and the raw data byte written using one read port and one write port per RAM. The process continues using two read ports and then one write port and one read port on alternating clock cycles.

For proper functionality matches to uninitialized parts of the history buffer RAMs is not allowed. If a potential match location is greater than the WPTR and the WPTR hasn't wrapped around to zero since the beginning of the data block, that location must be treated as a non-match.

In some implementations, the hashing compression core is configured through constants in a VHDL package called hash_pkg which resides the project common library. This allows complex data types to be defined that can be shared by the hashing compressor modules. More information about this package can be found in the documentation included with the common library. This module uses the constants HISTORY_SIZES, HISTORY_SIZE_BITS, MAX_HISTORY_SIZE, CHAIN_LENGTH, and MAX_MATCH.

In some implementations, a raw look ahead FIFO may be utilized. A raw lookahead FIFO is a four byte deep FIFO that accepts data from the RAW port and holds the data that is compared to history buffer data at potential match locations. In some implementations, the FIFO must be full or contain an end of block transfer before potential match locations can be accepted and processed. When an end of block is received, the FIFO doesn't accept any more incoming data until it empties out. Output from the FIFO is accepted whenever a transfer occurs on the di_match_locs port and the data output from the FIFO is written into the history RAMS.

In some implementations, there may be CHAIN_LENGTH match RAM blocks, each one containing a dual port history RAM. Each history RAM has a width of 9 and a depth of HISTORY_SIZES(I) where I is the index of the RAM in the range 0 to CHAIN_LENGTH−1. To allow reading four bytes per clock from an arbitrary address in the RAM, each RAM is built from four RAMs, each with a width of 9 and a depth of ¼ the logical RAM size. The first physical RAM stores locations 0, 4, 8, 12, . . . . The second contains 1, 5, 9, 13, . . . and so on.

Incoming raw data is written into the history RAMs at the location pointed to by the WPTR mod size of the RAM. Read addresses either come from an incoming potential match location di_match_locs(I) for RAM I, or from a match tracker assigned to the RAM. When no matches are pending, the read addresses come from the list of potential match locations, when there are matches being tracked it comes from the match tracker. The match tracker is responsible for incrementing the address as the match continues.

In high effort mode, the history RAMs are configured on alternate clocks as having one read and one write port and then having two read ports. On one clock, the incoming raw data byte is written and data from one potential match location read and on the next clock increment, data from two potential match locations is read.

Each match RAM may contain six match trackers: three primary match trackers and three lazy match trackers. In high effort mode, all match trackers are used, whereas in low effort mode, only one primary and one lazy match tracker are used per history RAM. Each match tracker contains a match location register, a match length register, and a flag to indicate if the match is valid or not. When a match starts, the match location is written with the history buffer address of the start of a potential match, the match length register is reset to 0, and the match valid register reset to 1. A match is checked by reading from the history buffer at the location addressed by the match location register, and comparing the data to the raw lookahead FIFO. If the data matches, then the match length and match address are advanced. If the data doesn't match, then the match is terminated and the match valid register is set to 0. The match control FSM will indicate when the match tracker can start tracking a new match.

In some implementations, the match control monitors matches in progress and controls when the match trackers must be loaded with new match locations. When all matches terminate, the best one must be selected to be output on the LZ port. If no potential match locations match, then the raw data byte is output on the LZ port as a literal. If matches start, then the module waits for all of them to terminate and then the longest one is selected and output as a length/distance pair. If the longest match is a lazy match, then the first RAW byte at the beginning of the match is output as a literal followed by the lazy match. In the case of more than one valid match with the same length, the primary match has priority over the lazy match and matches with lower indexes in the di_match_locs transfer have priority over higher indexes because the lower indexes will have smaller distances.

Asymmetric History Buffer Sizes

In the parallel architecture, large history buffers are expensive in terms of RAM usage since both the hash chain and history buffer RAMs are replicated and scale linearly with history buffer size. Some files get better compression ratios by checking lots of close potential matches, but others need large history sizes to find far away matches. Using different depths for the replicated RAMS allows the compression engine to check several matches that are close by, but also pick up on some matches that are farther away. The buffers may be arranged from smallest to largest, for example: 4K, 4K, 4K, 8K, 16K, 32K. This example would allow up to three potential matches with distances under 4K along with one under 8K, one under 16K, and one under 32K. The hash chain RAMs may have the same sizes, but the last one (the largest one) isn't needed since only CHAIN_LENGTH−1 chain RAMs are needed. When a hash head arrives at the first hash chain RAM, if the distance is farther than that instance supports (for example, 4K), then the hash head is passed to the next chain RAM until one is found that is large enough to look up the next match location. Match locations that are out of range for the given history buffer are treated as a no match.

Implementations utilizing this methodology may give better compression ratios while keeping memory usage under control thereby giving finer grained control over memory usage by allowing individual RAM instances to be changed to fit the available resources.

Half Speed/Better Compression (High Effort) Mode

In some implementations, architecture may be utilized that allows for tradeoffs between speed and compression ratios. If instead of processing one byte per clock, the core processes one byte every other clock cycle, the hash chain RAMs can look up twice as many potential match locations and the history RAMs can check twice as many potential matches. If the RAMs are all true dual port, then the half speed mode can check three times as many potential matches by configuring the write port as a read port every other clock cycle since there will be a new byte to write only every other clock. This design is dominated by RAMs so the extra logic to implement this is minimal from a resource usage standpoint. This design can also be configured for full speed or half speed mode on a block by block basis.

In places where the description above refers to particular implementations of parallel hash-based data compression, it should be readily apparent that a number of modifications may be made without departing from the spirit thereof and that these implementations may be applied to other to parallel hash-based data compression systems and methods.

The invention claimed is:

1. A method of parallel hash-based data compression comprising:
generating a hash value based on one or more original input data bytes of an incoming data stream using a processor;
looking up, by the processor, a hash head comprising a first potential match location identified by the hash value;
looking up, by the processor, at least one additional potential match location in a hash chain that comprises a linked list of potential match locations starting with a location indexed by the hash head;
checking, by the processor, the at least one potential match location of the hash chain for one or more valid matches in a history buffer random access memory (RAM); and
outputting, by the processor, a length and distance pair if a valid match is detected or the original input data byte if a match is undetected.

2. The method of claim 1, wherein the history buffer RAM comprises a plurality of history buffer RAMs such that each history buffer RAM corresponds to a separate hash chain RAM.

3. The method of claim 2, further comprising assigning each of a plurality of potential match locations to a separate history buffer RAM from among the plurality of history buffer RAMs.

4. The method of claim 3, wherein the plurality of history buffer RAMs is comprised of RAMs of varying sizes.

5. The method of claim 4, wherein the plurality of history buffer RAMs is organized in increasing sizes such that a higher number of more recent matches is searched while using equivalent RAM resources.

6. The method of claim 3, wherein the data processing rate is reduced such that a number of history buffer RAMs performing comparisons to determine a matching location address is proportionally increased by using additional time to search for multiple matches in each hash chain and history buffer RAM.

7. The method of claim 2, further comprising:
comparing the original input data byte and subsequent input data bytes to a byte in the history buffer RAM at each potential match location and one or more subsequent bytes from each corresponding location; and
finding all matches beginning at each potential match starting location having at least a minimum match length.

8. The method of claim 7, further comprising comparing a different plurality of potential match locations to a next incoming raw data byte when a match of a minimum length beginning at any of the prior plurality of potential match locations remains undetected.

9. The method of claim 7, further comprising comparing a next plurality of potential match locations after a comparison of a first plurality of potential match locations has begun.

10. The method of claim 9, further comprising:
selecting a longest match; and
outputting at least one of:
a length and offset in the history buffer RAM to the longest match when the longest match is among a first set of matches;
the length and offset in the history buffer RAM to the longest match from the first set of matches when the longest match between the first and a second set of matches is equal; and
a raw data byte that precedes the longest match and the length and offset in the history buffer RAM to the longest match when the longest match is among the second set of matches.

11. The method of claim 2, wherein the hash head and N−1 hash chain RAMs are organized to identify N potential match starting positions each clock cycle.

12. The method of claim 1, wherein an average data processing rate is equal to at least one uncompressed data byte per clock cycle.

13. A system for parallel hash-based data compression comprising:
a history buffer random access memory (RAM); and
a processor configured to:
generate a hash value based on one or more original input data bytes of an incoming data stream;
look up a hash head comprising a first potential match location identified by the hash value;
look up at least one additional potential match location in a hash chain that comprises a linked list of potential match locations starting with a location indexed by the hash head;
check the at least one potential match location of the hash chain for one or more valid matches in the history buffer RAM; and
output a length and distance pair if a valid match is detected or the original input data byte if a match is undetected.

14. The system of claim 13, wherein the history buffer RAM comprises a plurality of history buffer RAMs such that each history buffer RAM corresponds to a separate hash chain RAM.

15. The system of claim 14, wherein the processor is further configured to assign each of a plurality of potential match locations to a separate history buffer RAM from among the plurality of history buffer RAMs.

16. The system of claim 15, wherein the plurality of history buffer RAMs is comprised of RAMs of varying sizes.

17. The system of claim 16, wherein the plurality of history buffer RAMs is organized in increasing sizes such that a higher number of more recent matches is searched while using equivalent RAM resources.

18. The system of claim 15, wherein the data processing rate is reduced such that a number of history buffer RAMs performing comparisons to determine a matching location address is proportionally increased by using additional time to search for multiple matches in each hash chain and history buffer RAM.

19. The system of claim 14, wherein the processor is further configured to:
compare the original input data byte and subsequent input data bytes to a byte in the history buffer RAM at each potential match location and one or more subsequent bytes from each corresponding location; and
find all matches beginning at each potential match starting location having at least a minimum match length.

20. The system of claim 19, wherein the processor is further configured to compare a different plurality of potential match locations to a next incoming raw data byte when a match of a minimum length beginning at any of the prior plurality of potential match locations remains undetected.

21. The system of claim 19, wherein the processor is further configured to compare a next plurality of potential match locations after a comparison of a first plurality of potential match locations has begun.

22. The system of claim 21, wherein the processor is further configured to:
select a longest match; and
output at least one of:
a length and offset in the history buffer RAM to the longest match when the longest match is among a first set of matches;
the length and offset in the history buffer RAM to the longest match from the first set of matches when the longest match between the first and a second set of matches is equal; and
a raw data byte that precedes the longest match and the length and offset in the history buffer RAM to the longest match when the longest match is among the second set of matches.

23. The system of claim 14, wherein the hash head and N−1 hash chain RAMs are organized to identify N potential match starting positions each clock cycle.

24. The system of claim 13, wherein an average data processing rate is equal to at least one uncompressed data byte per clock cycle.

* * * * *